United States Patent
Urata et al.

(10) Patent No.: US 10,509,614 B2
(45) Date of Patent: Dec. 17, 2019

(54) VIDEO DISPLAY APPARATUS-APPARATUS COMMUNICATION

(71) Applicant: MAXELL, LTD., Kyoto (JP)

(72) Inventors: Hiroyuki Urata, Kyoto (JP); Yohei Kato, Kyoto (JP); Naoya Oka, Kyoto (JP)

(73) Assignee: MAXELL, LTD., Kyoto (JP)

(*) Notice: Subject to any disclaimer, the term of this patent is extended or adjusted under 35 U.S.C. 154(b) by 29 days.

(21) Appl. No.: 16/064,805

(22) PCT Filed: Dec. 25, 2015

(86) PCT No.: PCT/JP2015/086299
§ 371 (c)(1),
(2) Date: Jun. 21, 2018

(87) PCT Pub. No.: WO2017/109961
PCT Pub. Date: Jun. 29, 2017

(65) Prior Publication Data
US 2019/0005917 A1    Jan. 3, 2019

(51) Int. Cl.
*G09G 5/00* (2006.01)
*G06F 3/14* (2006.01)
(Continued)

(52) U.S. Cl.
CPC .......... *G06F 3/1431* (2013.01); *G09G 5/006* (2013.01); *G09G 2320/08* (2013.01);
(Continued)

(58) Field of Classification Search
CPC .... G06F 3/1423; G06F 3/1431; G06F 3/1446; G06F 3/1454; G06F 13/00; G06F 13/14;
(Continued)

(56) References Cited

U.S. PATENT DOCUMENTS

| | | | |
|---|---|---|---|
| 7,358,928 B2 | 4/2008 | Mori et al. | |
| 7,804,497 B2 * | 9/2010 | Song | G06F 3/1431 345/204 |

(Continued)

FOREIGN PATENT DOCUMENTS

JP    2011-234123 A    11/2011

OTHER PUBLICATIONS

International Search Report for WO 2017/109961 A1, dated Mar. 29, 2016.

*Primary Examiner* — Darlene M Ritchie
(74) *Attorney, Agent, or Firm* — Volpe and Koenig, P.C.

(57) ABSTRACT

A technique capable of realizing more suitable image output and the like for an own apparatus is provided with respect to communication among apparatuses in a system including a video display apparatus. A video display apparatus provided with an apparatus-apparatus communication interface (for example, an HDMI) holds own apparatus information. In a case where a video output apparatus is connected to a video input unit of the video display apparatus via a first apparatus-apparatus communication interface and a video output unit of the video display apparatus is connected to an external video display apparatus via a second apparatus-apparatus communication interface, external apparatus information is obtained from the external video display apparatus via the second apparatus-apparatus communication interface, and apparatus information (EDID) is provided to the video output apparatus via the first apparatus-apparatus communication interface.

11 Claims, 14 Drawing Sheets

(51) Int. Cl.
*G09G 5/12* (2006.01)
*H04N 21/4363* (2011.01)
*H04N 21/41* (2011.01)

(52) U.S. Cl.
CPC ... *G09G 2370/04* (2013.01); *G09G 2370/047* (2013.01); *G09G 2370/12* (2013.01); *H04N 21/4122* (2013.01); *H04N 21/43635* (2013.01)

(58) Field of Classification Search
CPC . G06F 13/10; G09G 5/12; G09G 5/14; G09G 5/006; G09G 2300/023; G09G 2300/026; G09G 2370/047; G09G 2370/12; G09G 2370/04; G09G 2370/042; G09G 2340/02; G09G 2320/08; H04N 21/4854; H04N 21/4122; H04N 21/43635
See application file for complete search history.

(56) References Cited

U.S. PATENT DOCUMENTS

| | | | |
|---|---|---|---|
| 8,776,163 B2* | 7/2014 | Cirstea | H04N 7/102 710/65 |
| 9,787,937 B1* | 10/2017 | Hung | H04N 7/0122 |
| 2004/0046707 A1* | 3/2004 | Mori | G06F 3/1431 345/1.1 |
| 2004/0046772 A1* | 3/2004 | Ouchi | G09G 5/005 345/690 |
| 2007/0280646 A1* | 12/2007 | Seita | H04N 5/781 386/231 |
| 2008/0186253 A1* | 8/2008 | Kim | G06F 3/1431 345/3.3 |
| 2012/0182474 A1* | 7/2012 | Kobayashi | G06F 3/14 348/529 |
| 2013/0060896 A1* | 3/2013 | Ke | G06F 13/385 709/217 |

* cited by examiner

FIG. 3

MODE ACCORDING TO STATE OF VIDEO DISPLAY APPARATUS 2

| EXTERNAL VIDEO OUTPUT AND USER SETTING STATE OF MODE IN OWN APPARATUS | | STATE REGARDING IMAGE OUTPUT AND MODE SELECTION IN OWN APPARATUS | |
|---|---|---|---|
| | | (a) IMAGE OUTPUT STATE | (b) NO IMAGE OUTPUT STATE (STANDBY OR ERROR) |
| (A) EXTERNAL VIDEO OUTPUT ON | (1) EXTERNAL APPARATUS INFORMATION PRIORITY MODE | (1) EXTERNAL APPARATUS INFORMATION PRIORITY MODE (ACCORDING TO USER SETTING) | (1) EXTERNAL APPARATUS INFORMATION PRIORITY MODE |
| | (2) OWN APPARATUS INFORMATION PRIORITY MODE | (2) OWN APPARATUS INFORMATION PRIORITY MODE (ACCORDING TO USER SETTING) | (1) EXTERNAL APPARATUS INFORMATION PRIORITY MODE (AUTOMATIC SWITCHING) |
| (B) EXTERNAL VIDEO OUTPUT OFF | | (2) OWN APPARATUS INFORMATION PRIORITY MODE | (2) OWN APPARATUS INFORMATION PRIORITY MODE |

FIG. 4
(A) EDID TRANSMISSION OF FIRST MODE
IN A CASE WHERE EXTERNAL APPARATUS HAS LOWER PERFORMANCE
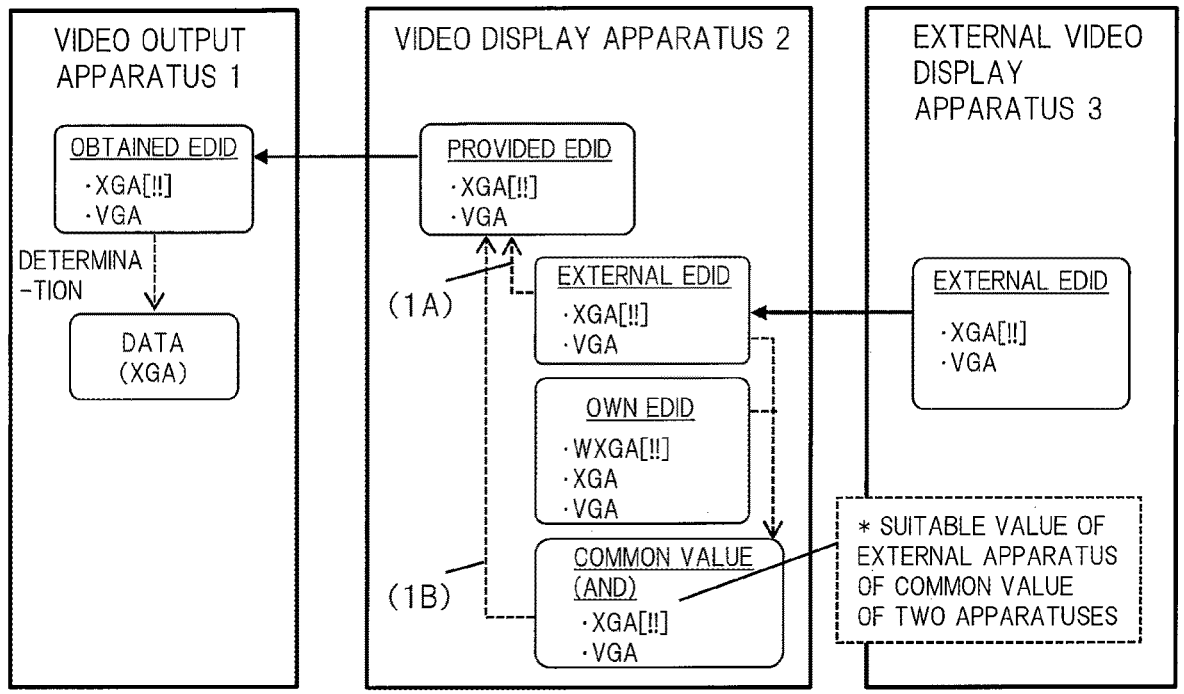
(B) EDID TRANSMISSION OF FIRST MODE
IN A CASE WHERE EXTERNAL APPARATUS HAS HIGHER PERFORMANCE
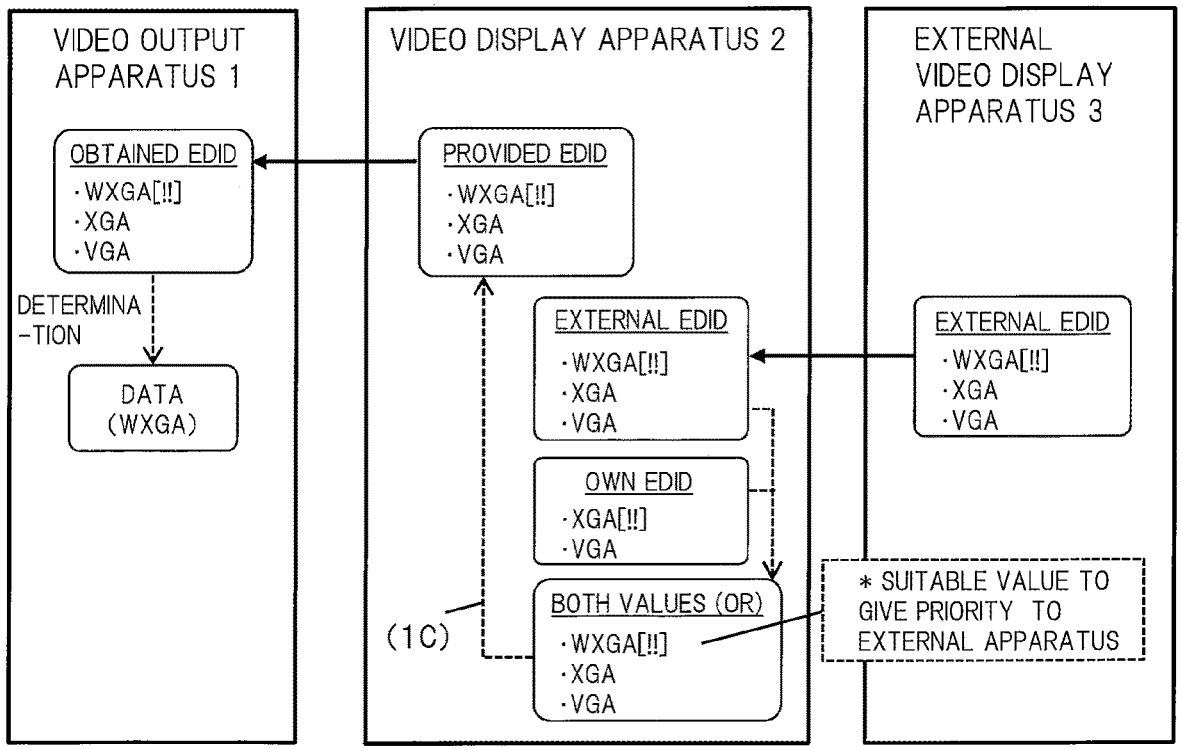

FIG. 5
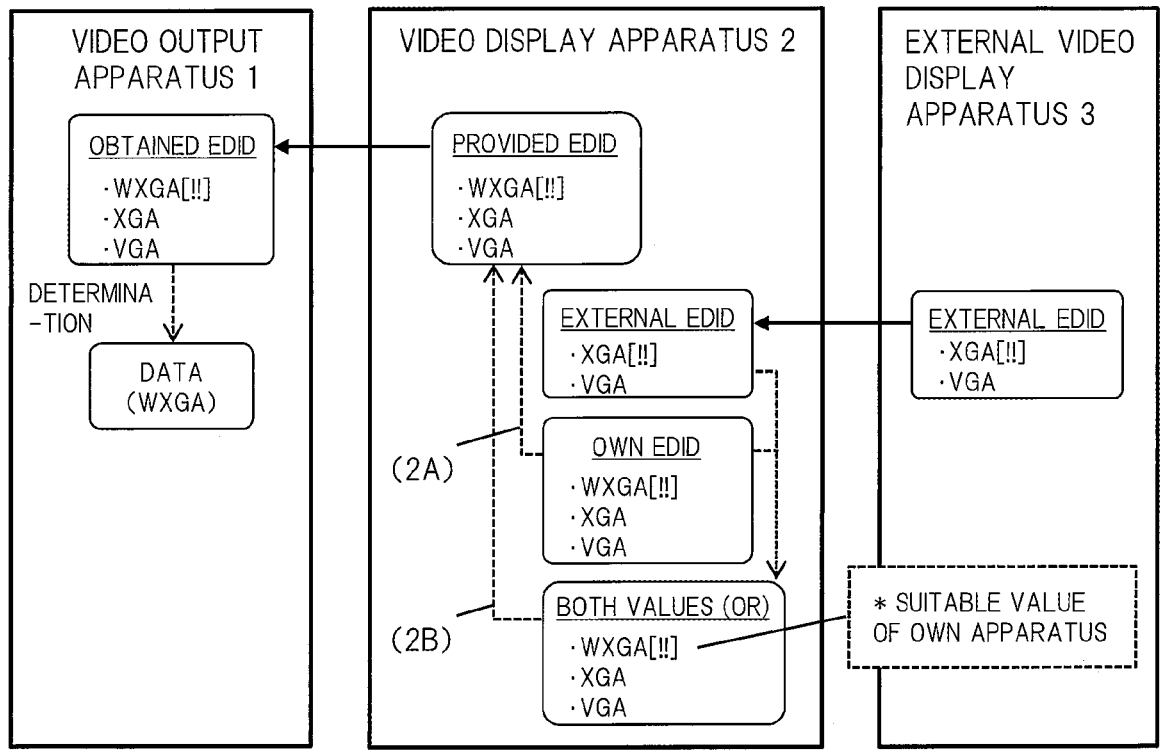
(A) EDID TRANSMISSION OF SECOND MODE
IN A CASE WHERE EXTERNAL APPARATUS HAS LOWER PERFORMANCE
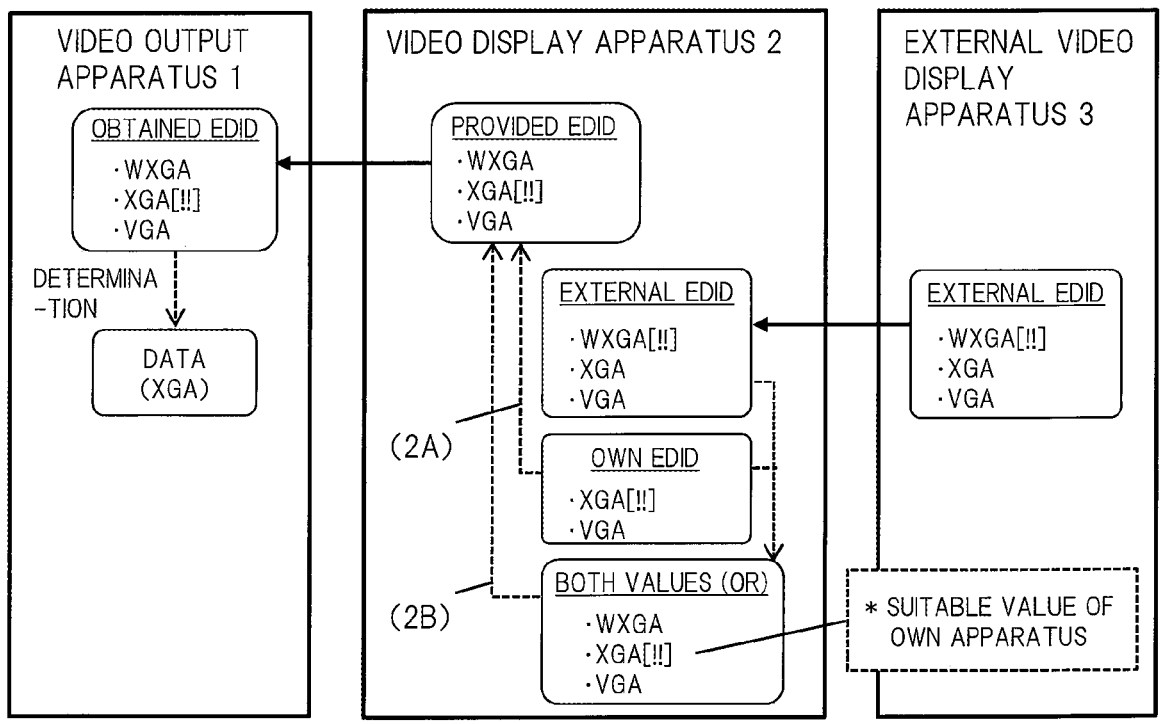
(B) EDID TRANSMISSION OF SECOND MODE
IN A CASE WHERE EXTERNAL APPARATUS HAS HIGHER PERFORMANCE

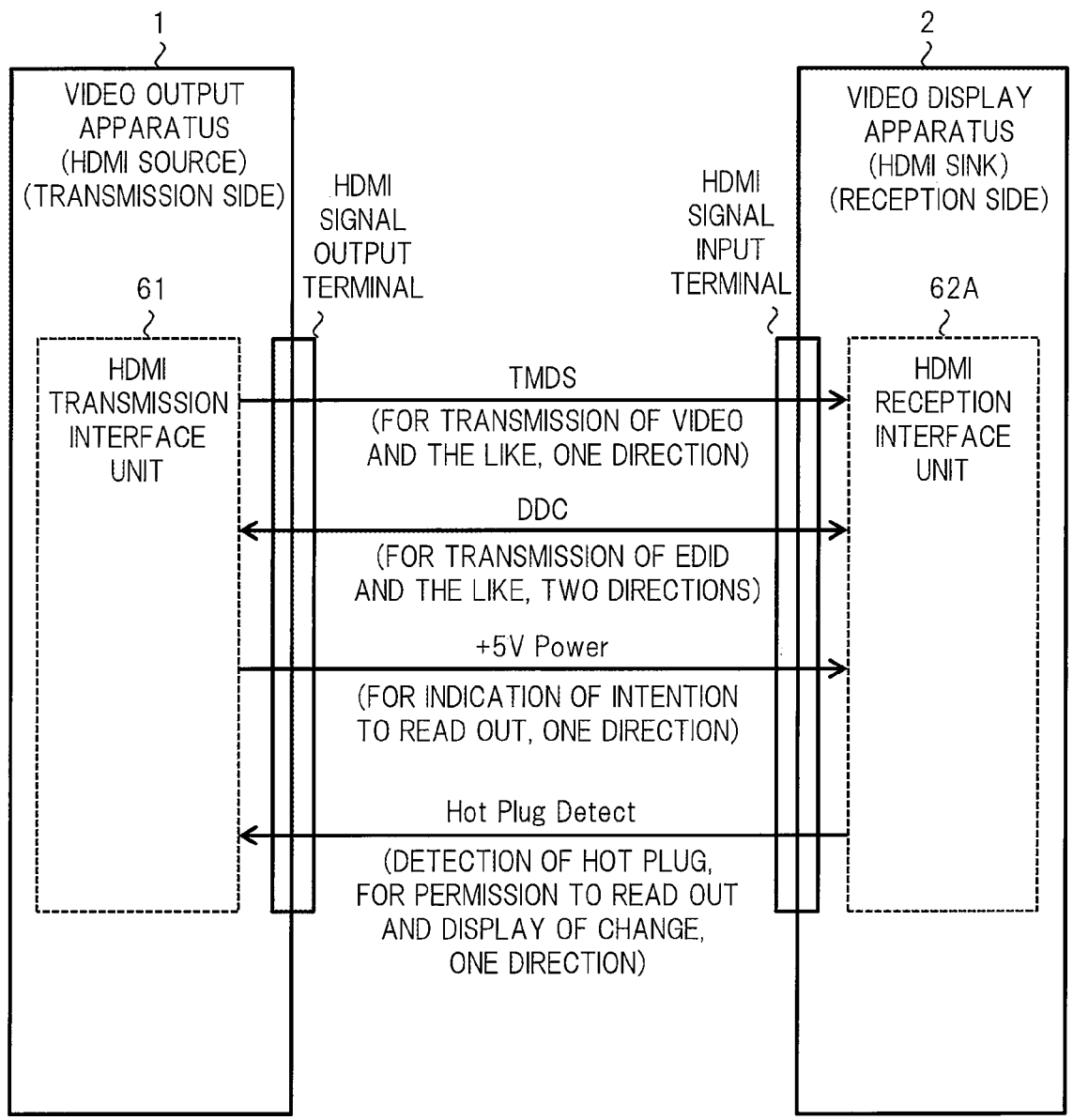

FIG. 10

EXTERNAL VIDEO OUTPUT CONTROL OPERATION

| STATE OF MODE | EXTERNAL VIDEO OUTPUT CONTROL OPERATION IN A CASE WHERE OWN APPARATUS IS IN ERROR STATE OR BECOMES NO IMAGE OUTPUT STATE (OFF CONTROL OPERATION) | | |
|---|---|---|---|
| | AV-OFF (AV SIGNAL STOP) | AV-MUTE (AV MUTE SIGNAL OUTPUT) | AV-ERROR (AV ERROR SIGNAL OUTPUT) |
| (1) EXTERNAL APPARATUS INFORMATION PRIORITY MODE | ○ | ○ | ○ |
| (2) OWN APPARATUS INFORMATION PRIORITY MODE | ○ | ○ | ○ |

\* ○: SELECTABLE

FIG. 11
MENU SCREEN AND USER SETTING OPERATION
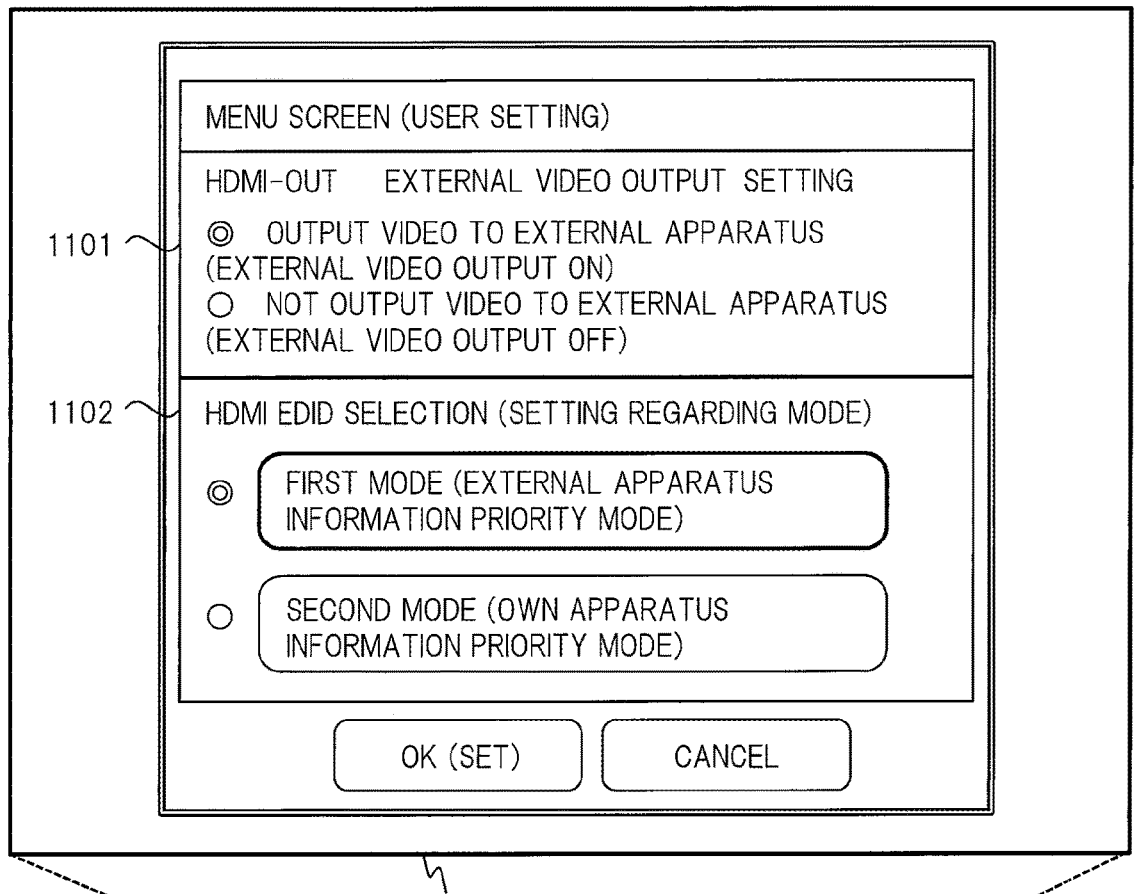
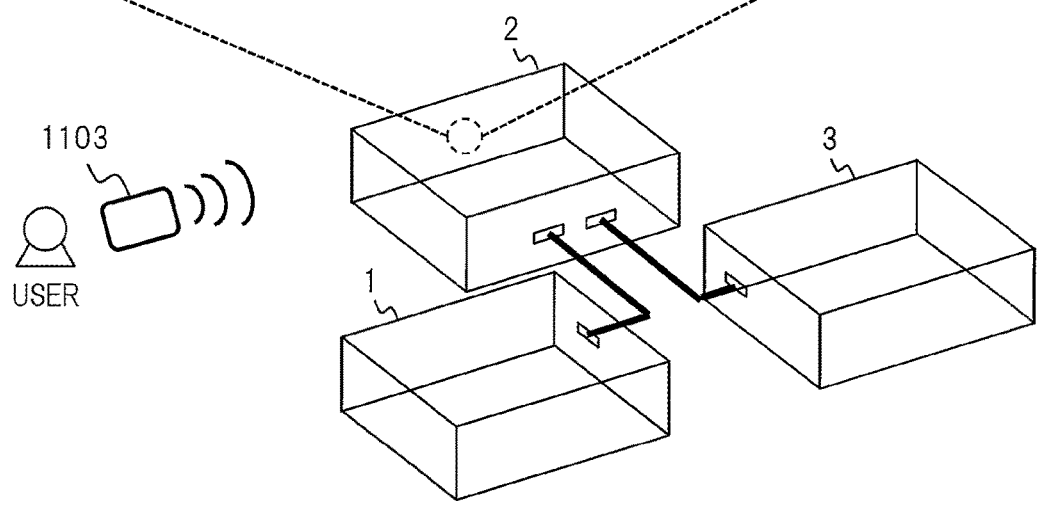

VIDEO OUTPUT EXAMPLE IN CASE OF SECOND MODE

VIDEO DISPLAY APPARATUS-APPARATUS COMMUNICATION

TECHNICAL FIELD

The present invention relates to a video display technique, and relates to communication between connected apparatuses including a video display apparatus.

BACKGROUND ART

As video display apparatuses, there are various kinds of apparatuses such as a TV receiver, a monitor, a projector and the like. Video data outputted from a video output apparatus that is connected to a front stage thereof may be inputted to a video display apparatus (hereinafter, it may also be described as "video input"), and a video may be displayed on its own screen on the basis of the video data (hereinafter, it may also be described as "image output"). Further, the video display apparatus may output the video data to an external video display apparatus that is connected to a rear stage thereof (hereinafter, it may also be described as "video output"), and the external video display apparatus is caused to display the video on a screen.

As a communication interface between apparatuses including the video display apparatus, there is an HDMI (High-Definition Multimedia Interface). The HDMI is standard specification of a communication interface via which a digital signal of multimedia data containing data such as a video, an audio, and a command and information is transmitted between apparatuses. In apparatuses corresponding to the HDMI, HDMI connectors between the apparatuses are connected via an HDMI cable.

The HDMI contains a mechanism to transmit EDID (Extended Display Identification Data) between apparatuses. The EDID is apparatus information that contains a parameter value representing specification or performance of an apparatus, and contains resolution of video data (referred to also as a "screen pixel number" or the like) as one parameter value, for example. By transmission of EDID between connected apparatuses, authentication between apparatuses, determination of multimedia data to be inputted or outputted between apparatuses, and the like are carried out.

U.S. Pat. No. 7,358,928 (Patent Document 1) is cited as an example of prior art regarding communication between apparatuses including a video display apparatus.

RELATED ART DOCUMENTS

Patent Documents

Patent document 1: U.S. Pat. No. 7,358,928

SUMMARY OF THE INVENTION

Problems to be Solved by the Invention

The technique described in Patent Document 1 is a technique that aims for video output and image output, which are suitable for the whole system in which a plurality of apparatuses is connected to each other, and is a similar technique to HDMI standards. Such prior art often becomes video output and image output that give priority to the whole system. However, an individual video display apparatus may not become suitable video output and image output. In particular, an external video display apparatus at a rear stage thereof can output an image that gives priority to suitable video output, but the video display apparatus may not be able to output a suitable image.

In a mechanism to transmit apparatus information via an apparatus-apparatus communication interface according to the prior art, there are problems as follows. It is thought a system in which a video output apparatus as a video input source is connected to a video display apparatus (hereinafter, it may also be described as "own apparatus") Placed at a front stage thereof and an external video display apparatus as a video output destination (hereinafter, it may also be described as "external apparatus") is connected to a rear stage thereof. In the system, the video display apparatus provides external apparatus information, which is apparatus information obtained from the external apparatus placed at a rear stage thereof, (or apparatus information containing a common value of the external apparatus information and own apparatus information) to the video output apparatus placed at the front stage thereof. The video output apparatus refers to the apparatus information to determine video data to be outputted to the video display apparatus and the like. As a result, suitable image output is realized in the external video display apparatus, but image output with low performance may be realized in the video display apparatus. Namely, by receiving restriction by means of a parameter value of specification or performance indicated by the external apparatus information in the video display apparatus, an image with lower resolution than suitable resolution for the own apparatus may be outputted.

It is an object of the present invention to provide a technique capable of more suitable image output and the like for an own apparatus.

Means for Solving the Problem

A representative embodiment of the present invention is a video display apparatus including features described below. A video display apparatus according to one embodiment is a video display apparatus provided with an apparatus-apparatus communication interface (for example, an HDMI), wherein own apparatus information is held therein. In a case where a video input unit of the video display apparatus is connected to a video output apparatus via a first apparatus-apparatus communication interface and a video output unit of the video display apparatus is connected to an external video display apparatus via a second apparatus-apparatus communication interface, external apparatus information of the external video display apparatus is obtained from the external video display apparatus via the second apparatus-apparatus communication interface, and apparatus information is provided to the video output apparatus via the first apparatus-apparatus communication interface. A first mode for providing the apparatus information that contains a parameter value of the external apparatus information and a second mode for providing the apparatus information that contains a parameter value of the own apparatus information are prepared as modes for providing the apparatus information.

Effects of the Invention

According to a representative embodiment of the present invention, it is possible to realize more suitable image output and the like for an own apparatus.

BRIEF DESCRIPTIONS OF THE DRAWINGS

FIG. 3 is a view showing modes according to states in the first embodiment.

FIG. 4 is a view showing EDID transmission of a first mode according to the first embodiment.

FIG. 5 is a view showing the EDID transmission of a second mode according to the first embodiment.

FIG. 9 is a view showing a configuration related to the EDID transmission between connected apparatuses of HDMI according to the first embodiment.

FIG. 10 is a view showing an external video output control operation according to the first embodiment.

FIG. 11 is a view showing display of a menu screen and a user setting operation according to the first embodiment.

DETAILED DESCRIPTION OF EMBODIMENTS

First Embodiment

A video display apparatus according to a first embodiment of the present invention will be described with reference to FIG. 1 to FIG. 12.

[Video Display System]

Figure 1:
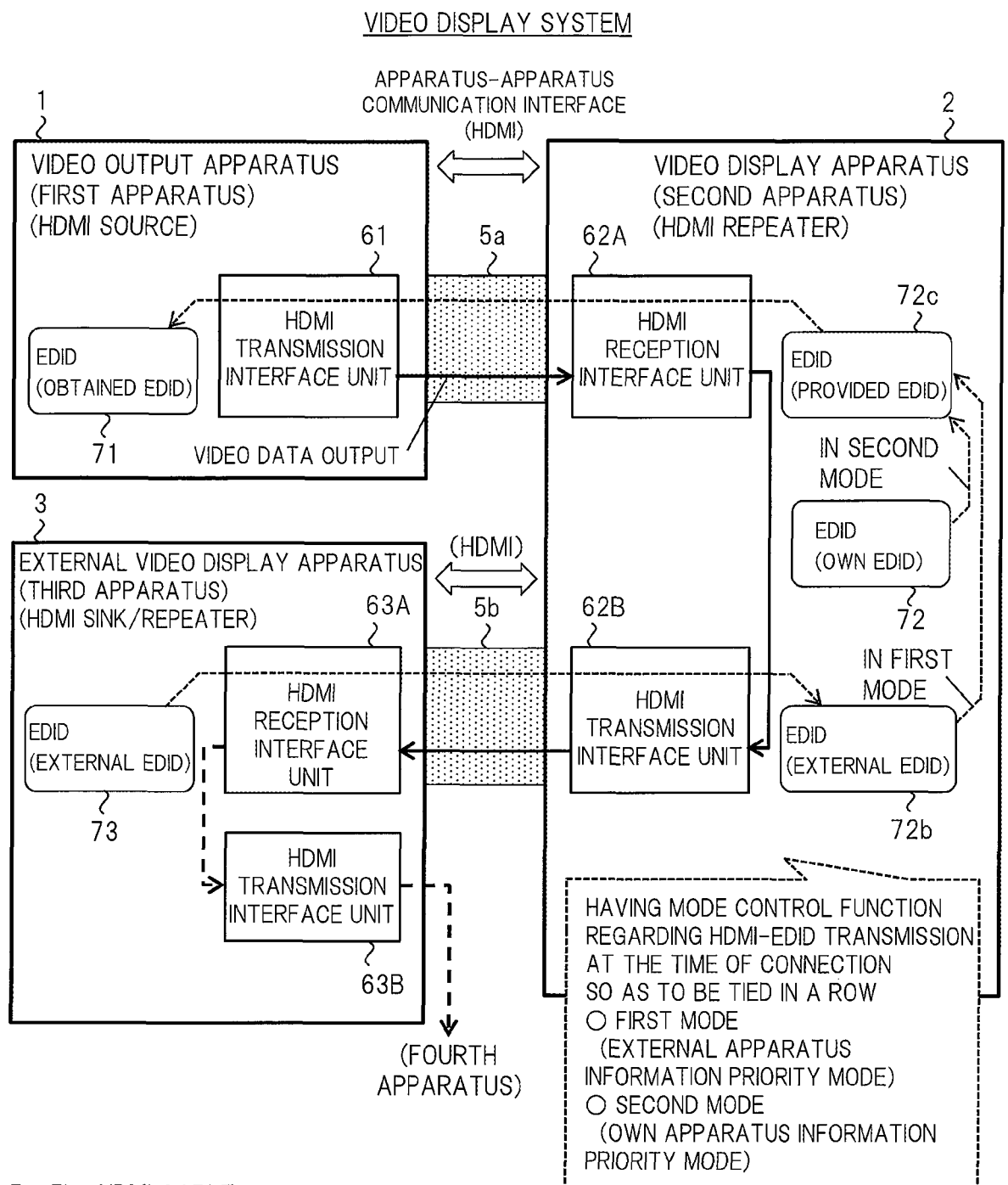
FIG. 1 is a view showing a configuration of a video display system including a video display apparatus according to a first embodiment of the present invention.

FIG. 1 shows a configuration of a video display system that includes a video display apparatus according to the first embodiment. The video display system includes a video output apparatus 1 that is a first apparatus, a video display apparatus 2 that is a second apparatus, and an external video display apparatus 3 that is a third apparatus. The video display system is a system in which a plurality of apparatuses, for example, at least three apparatuses are connected in series. In other words, the video display system is a system in which the apparatuses are connected so as to be tied in a row (Daisy Chain). The video display system is a system in which the video display apparatus 2 is positioned at the center, the video output apparatus 1 that is a video input source is connected to a front stage thereof, and the external video display apparatus 3 that is a video output destination is connected to a rear stage thereof.

The video output apparatus 1 is an HDMI source, the video display apparatus 2 is an HDMI repeater, and the external video display apparatus 3 is an HDMI sink or HDMI repeater. The video display apparatus 2 is an HDMI sink with respect to the video output apparatus 1, and is an HDMI source with respect to the external video display apparatus 3.

Each apparatus of the video output apparatus 1, the video display apparatus 2, and the external video display apparatus 3 is an apparatus compliant with the HDMI as an apparatus-apparatus communication interface. As the external video display apparatus 3, it is not limited to one apparatus, and a plurality of apparatuses may be connected in series. The HDMI as a first apparatus-apparatus communication interface connects between apparatuses of the video output apparatus 1 and the video display apparatus 2. The HDMI as a second apparatus-apparatus communication interface connects between apparatuses of the video display apparatus 2 and the external video display apparatus 3. An HDMI cable 5a connects between an HDMI signal input/output terminal of the video output apparatus 1 and an HDMI signal input/output terminal of the video display apparatus 2. An HDMI cable 5b connects between an HDMI signal input/output terminal of the video display apparatus 2 and an HDMI signal input/output terminal of the external video display apparatus 3.

The video output apparatus 1 includes an HDMI transmission interface unit 61 configured to output an HDMI signal that contains a video signal. Namely, a function as a video output unit is included in functions of the HDMI transmission interface unit 61. The video display apparatus 2 has an HDMI reception interface unit 62A configured to receive the HDMI signal that contains the video signal and a HDMI transmission interface unit 62B configured to output the HDMI signal that contains the video signal. Namely, a function as a video input unit is included in functions of the HDMI reception interface unit 62A, and a function as a video output unit is included in functions of the HDMI transmission interface unit 62B. The external video display apparatus 3 has an HDMI reception interface unit 63A configured to receive the HDMI signal that contains the video signal and an HDMI transmission interface unit 63B configured to output the HDMI signal that contains the video signal. Namely, a function as a video input unit is included in functions of the HDMI reception interface unit 63A, and a function as a video output unit is included in functions of the HDMI transmission interface unit 63B. The HDMI transmission interface unit 63B is used when to connect to a fourth external video display apparatus.

The external video display apparatus 3 holds EDID 73 that is its own apparatus information. This EDID 73 is external apparatus information when viewed from the video display apparatus 2, and is also called as "external EDID" for explanation. The video display apparatus 2 holds EDID 72 that is its own apparatus information. This EDID 72 is own apparatus information, and is also called as "own EDID" for explanation.

The video display apparatus 2 obtains the EDID 73 of the external video display apparatus 3 that is connected to the rear stage thereof, and holds the EDID 73 as EDID 72b. The video display apparatus 2 constitutes EDID 72c containing information for providing to the video output apparatus 1 connected to the front stage thereof on the basis of the EDID 72b that is external EDID and the EDID 72 that is own EDID. This EDID 72c is also called as "provided EDID" for explanation. The video output apparatus 1 obtains the EDID 72c, which is the provided EDID, from the video display apparatus 2 placed at the rear stage thereof. This EDID 72c is also called as "obtained EDID" for explanation.

The video display apparatus 2 has a mode control function regarding transmission of EDID of HDMI in case of connection so as to be tied in a row like FIG. 1. The video display apparatus 2 has a first mode and a second mode that are related to this mode control function. These modes are modes related to how to control transmission of EDID in the video display apparatus 2 among a plurality of apparatuses including the apparatuses placed at the front stage thereof and the rear stage thereof.

The first mode is an external apparatus information priority mode; is a similar mode to a mechanism of transmission of EDID under the HDMI standards; and is a mode to transmit, to the video output apparatus 1, EDID of a logical product of EDID of an own apparatus and EDID of an external apparatus. The first mode is realized so as to give priority to suitable image output to the external apparatus by setting provided EDID containing a parameter value of external EDID.

The second mode is an own apparatus information priority mode; is an expansive mode specific to the first embodiment; and is a mode to transmit to the video output apparatus 1 so as to give priority to EDID of an own apparatus compared with an external apparatus. The second mode is realized so as to give priority to suitable image output to the own apparatus by setting provided EDID containing a parameter value of own EDID.

At the time of the first mode, for example, the video display apparatus 2 provides a parameter value of the EDID 72b, which is the external EDID, to the video output apparatus 1 as the EDID 72c, which is the provided EDID. At the time of the second mode, for example, the video display apparatus 2 provides a parameter value of the EDID 72, which is the own EDID, to the video output apparatus 1 as the EDID 72c, which is the provided EDID.

The video output apparatus 1 refers to a parameter value of EDID 71, which is EDID obtained from the video display apparatus 2 to determine multimedia data containing video data to be outputted to the video display apparatus 2. The video output apparatus 1 refers to resolution contained in the obtained EDID 71, for example, to determine resolution of the video data to be outputted in view of the resolution.

The video output apparatus 1 transmits the multimedia data containing the determined video data to the video display apparatus 2 through the HDMI transmission interface unit 61. The video display apparatus 2 receives the multimedia data through the HDMI reception interface unit 62A, and carries out image output in its own display unit by using the data. Further, since the video display apparatus 2 is the HDMI repeater, the video display apparatus 2 transmits the multimedia data to the external video display apparatus 3 through the HDMI transmission interface unit 62B. The external video display apparatus 3 receives the multimedia data through the HDMI reception interface unit 63A, and carries out image output in its own display unit by using the data. Moreover, in a case where an external video display apparatus that is a fourth apparatus is connected to a rear stage thereof, the external video display apparatus 3 similarly transmits the data to the apparatus positioned at the rear stage thereof through the HDMI transmission interface unit 63B.

As the video output apparatus 1, various kinds of apparatuses such as a high-definition TV receiver (HDTV), a PC, a set-top box, a player of a DVD, a Blu-ray (registered trademark) or the like, and a video game machine can be applied. As the video display apparatus 2 and the external video display apparatus 3, various kinds of apparatuses such as a TV receiver, a monitor, a projector, a switcher, and a distributor can be applied.

The connection so as to be tied in a row is series connection according to the HDMI standards. It indicates a connection configuration in which the video output apparatus 1 is connected to the front stage of the video display apparatus 2 and the external video display apparatus 3 is connected to the rear stage thereof. It is not limited to one, but a plurality of external video display apparatuses 3 may be connected in series to the rear stage of the video display apparatus 2. The connection so as to be tied in a row is not limited to the connection configuration shown in FIG. 1. A configuration in which a plurality of apparatuses is connected to the front stage of the video display apparatus 2 so as to branch in parallel, and a configuration in which a plurality of apparatuses is connected to the rear stage thereof so as to branch in parallel are allowed in accordance with the HDMI standards. The mode control function and the like according to the first embodiment also function in these connection configurations.

[Video Display Apparatus]

Figure 2:
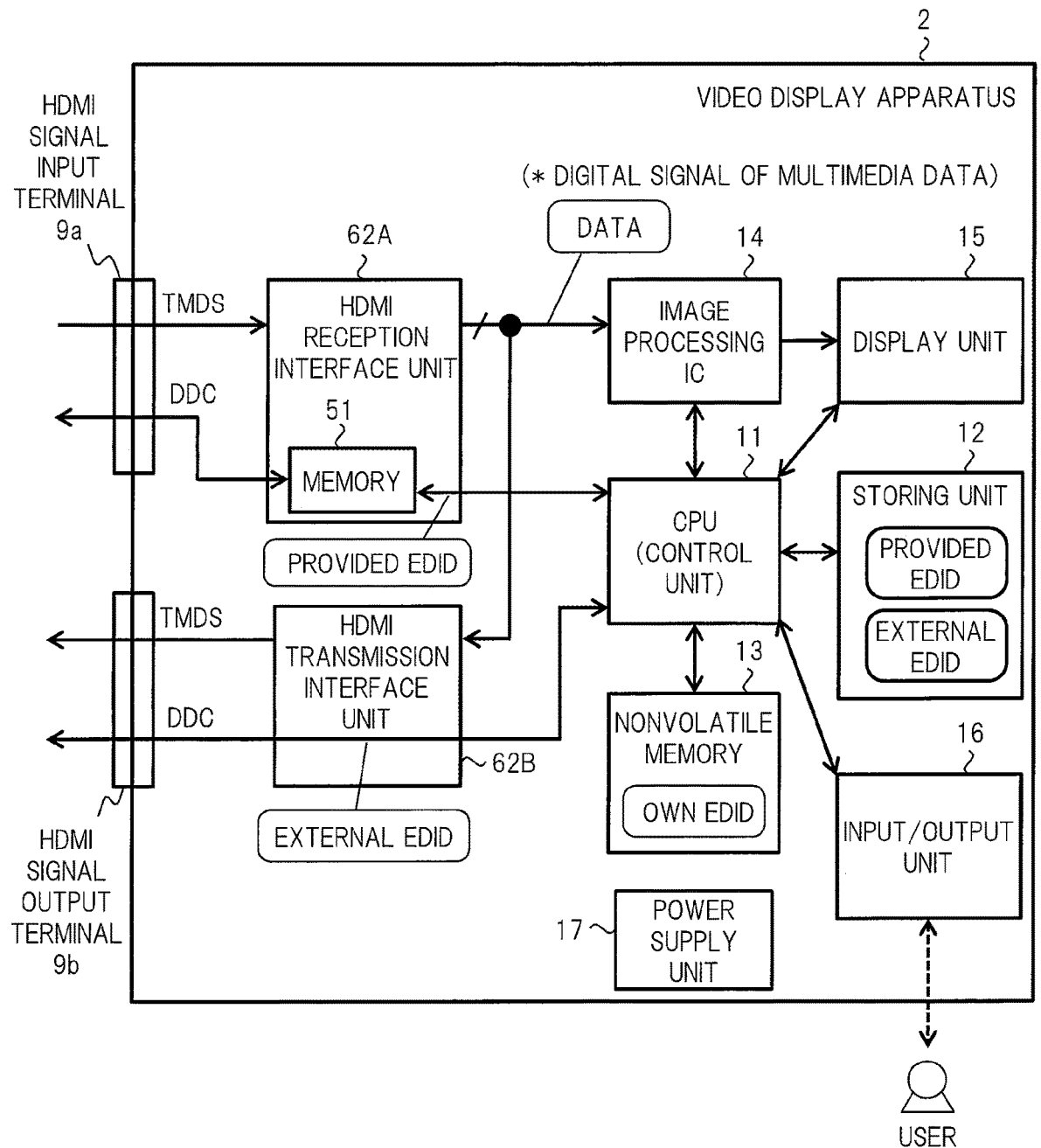
FIG. 2 is a view showing a configuration of the video display apparatus according to the first embodiment of the present invention.

FIG. 2 shows a functional block configuration of the video display apparatus 2 according to the first embodiment. The video display apparatus 2 includes the HDMI reception interface unit 62A, the HDMI transmission interface unit 62B, a CPU 11, a storing unit 12, a nonvolatile memory 13, an image processing IC 14, a display unit 15, an input/output unit 16, a power supply unit 17, an HDMI signal input terminal 9a, an HDMI signal output terminal 9b, and the like. Depending upon a type thereof, the video display apparatus 2 includes other elements such as a wireless communication interface unit, for example.

The CPU 11 is a control unit configured to control the whole video display apparatus 2. The CPU 11 gives a control instruction to each of the HDMI reception interface unit 62A, the HDMI transmission interface unit 62B and the like. The CPU 11 realizes control functions including the mode control function while maintaining cooperation with the HDMI reception interface unit 62A, the HDMI transmission interface unit 62B and the like. In the first embodiment, the subject of the mode control function is the CPU 11. However, the subject of control processing is not limited to this. As a modification example, it may be the HDMI reception interface unit 62A, the HDMI transmission interface unit 62B or the like.

Data and information related to processes of the CPU 11 and the like are stored in the storing unit 12. The EDID is contained as the information stored in the storing unit 12. Information containing the EDID 72 of FIG. 1, which is the own EDID of the video display apparatus 2, is held in the nonvolatile memory 13, and this information is held therein when a power source is turned off. In this regard, the storing unit 12 and/or the nonvolatile memory 13 may be configured integrally with the CPU 11 or as a different body therefrom.

The image processing IC 14 is an IC that carries out image processing and the like for image output with respect to the video data of the multimedia data from the HDMI reception interface unit 62A. The image processing IC 14 outputs data for image output after the image processing to the display unit 15. The display unit 15 displays a video on a screen on the basis of the data for image output. For details, the display unit 15 is an output device according to a type of the video display apparatus 2, and is a liquid crystal display unit of a projection display unit, for example. In a case where the video display apparatus 2 is a projector, for example, the projection display unit includes components such as a light source, a display element, and a projection optical system.

The input/output unit 16 includes an input/output interface with an input device and an output device, is an element that constitutes a user interface. The input/output unit 16 may include an operation panel, an LED unit (will be described later), a remote controller, a remote-control light receiving unit, and the like. The power supply unit 17 supplies electric power to each unit.

The HDMI reception interface unit 62A and the HDMI transmission interface unit 62B are connected to each other. The HDMI reception interface unit 62A is a receiving unit, and carries out a process to receive the multimedia data containing the video data from the video output apparatus 1 as the video input source, and the like. The HDMI reception interface unit 62A is connected to a signal line of the HDMI signal input terminal 9a, and has an output signal line to the image processing IC 14 and the HDMI transmission interface unit 62B. The HDMI transmission interface unit 62B is a transmitting unit, and carries out a process to transmit the multimedia data containing the video data to the external video display apparatus 3 as the video output destination, and the like. The HDMI transmission interface unit 62B is connected to a signal line of the HDMI signal output terminal 9b. In a case where video output to the external video display apparatus 3 positioned at the rear stage thereof is carried out, the HDMI transmission interface unit 62B transmits the same data as the multimedia data received by the HDMI reception interface unit 62A to the outside as they are.

The HDMI signal input terminal 9a is an HDMI signal input terminal side, and the HDMI cable 5a of FIG. 1 is connected thereto. The HDMI signal output terminal 9b is an HDMI signal output terminal side, and the HDMI cable 5b of FIG. 1 is connected thereto. Each of the HDMI signal input/output terminals 9a, 9b is compliant with the HDMI signal. FIG. 2 shows TMDS (Transition Minimized Differential Signaling) and DDC (Display Data Channel) as the signal lines of the HDMI signal input/output terminals 9a, 9b. Although details thereof will be described later, the TMDS is a signal line to transmit a digital signal of multimedia data and the DDC is a signal line to transmit EDID.

When the EDID transmission between the connected apparatuses is carried out, the CPU 11 obtains external EDID from the external video display apparatus 3 positioned at the rear stage thereof via the HDMI transmission interface unit 62B, and stores the external EDID in the storing unit 12. The CPU 11 uses a logical product of the external EDID of the storing unit 12 and own EDID of the nonvolatile memory 13 to constitute provided EDID with respect to the video output apparatus 1 positioned at the front stage thereof, and stores it in the storing unit 12 or a memory 51. In this regard, FIG. 2 shows an example in which the memory 51 is included in the HDMI reception interface unit 62A, but the memory 51 may be configured as a different body from the HDMI reception interface unit 62A. The provided EDID stored in the storing unit 12 or the memory 51 is transmitted to the video output apparatus 1 positioned at the front stage thereof via the HDMI reception interface unit 62A.

In this regard, the image output indicates that a video is displayed on a screen by using a display unit in the video display apparatus 2 (own apparatus), in other words, that multimedia data are reproduced. The video output indicates that multimedia data containing video data are outputted or transmitted from the own apparatus to another apparatus through an HDMI signal output terminal between the apparatuses connected by the HDMI.

[Mode_(1)]

The first mode and the second mode, each of which is a mode in the mode control function of the video display apparatus 2, will be described with reference to FIG. 3 to FIG. 5. The video display apparatus 2 takes a state of the first mode or the second mode during operation.

A table of FIG. 3 is a table in which selection and application of a mode according to a state of the video display apparatus 2 are put together. In the table of FIG. 3, a left column indicates external video output and a user setting state of the mode in the own apparatus, and a right column indicates a state regarding image output and mode selection in the own apparatus. The left column corresponds to a state that a user set via a menu screen (will be described later). The right column indicates which mode is actually selected and applied in accordance with the state regarding the image output. An intersection portion of a matrix in the table indicates a mode selected and applied in accordance with the user setting state and the state regarding the image output.

The left column has a row (A) external video output on and a row (B) external video output off as the user setting state of the external video output. The row (A) indicates a setting state in which video output to an external apparatus is carried out, and the row (B) indicates a setting state in which the video output to the external apparatus is not carried out. In this regard, in the setting state of (B) external video output off, there are the case where an external apparatus is actually connected to a rear stage thereof and the case where it is not connected thereto. The row of (A) external video output on further has a row (1) external apparatus information priority mode that is the first mode and a row (2) own apparatus information priority mode that is the second mode.

The right column has a column (a) image output state and a column (b) no image output state. The column (a) indicates a state that an image is outputted in the own apparatus or a state that an image can be outputted, and the column (b) indicates a state that an image is not outputted in the own apparatus or a state that an image cannot be outputted. For example, in a case where the own apparatus is in a stand-by state or an error state, it becomes the no image output state of (b).

(A) The case of the user setting state of the external video output on is as follows. In the external video output on, the first mode or the second mode is set. In such a case, the video display apparatus 2 properly uses the two modes in (a) image output state or (b) no image output state, thereby changing a control method. Namely, in (a) image output state, the mode according to the user setting state is selected as it is. In (b) no image output state, the first mode is selected in accordance with other conditions. Even in a case where the user setting state is the second mode, the first mode is selected.

(A-1) In case of the setting state of the external video output on and the first mode, the first mode that is a mode according to the user setting is applied as it is in (a) image output state. Since priority is given to an external apparatus in (b) no image output state, the first mode is applied.

(A-2) In case of the setting state of the external video output on and the second mode, the second mode that a mode according to the user setting is applied as it is in (a) image output state. Since priority is given to an external apparatus in (b) no image output state, the first mode is applied instead of the second mode. Namely, in a case where the video display apparatus 2 becomes this state, the video display apparatus 2 automatically switches from the second mode to the first mode.

(B) The case of the user setting state of the external video output off is as follows. In this case, in the first embodiment, as shown in the table, the own apparatus information priority mode that is the second mode is applied in either (a) image output state or (b) no image output state. In the setting state of the external video output off, the video display apparatus 2 does not carry out video output to set the second mode neither in a case where an external apparatus is not connected to the rear stage thereof nor in a case where it is connected thereto. This is because there is no need to consider an external apparatus positioned at a rear stage thereof in this state and the video display apparatus 2 can give priority to performance in the own apparatus.

In this regard, in a case where it is detected that an external apparatus is connected to the rear stage thereof by a hot plug signal from the state of the second mode described above, the video display apparatus 2 may further switch from the second mode to the first mode automatically. Further, as other control, in a case where it is detected that an external apparatus is connected to the rear stage thereof in the state of the second mode described above, the video display apparatus 2 may display a predetermined menu screen automatically. On the menu screen, an apparatus connection status is displayed to the user to confirm whether to switch from the second mode to the first mode or not. In a case where switching to the first mode is selected in response to a user operation to the menu screen, the video display apparatus 2 switches from the second mode to the first mode. These controls allow to shift to a state to give priority to performance in the external apparatus positioned at the rear stage thereof.

Moreover, in a case where it is recognized to change from a state that the external apparatus positioned at the rear stage thereof is connected to a state that it is not connected thereto on the basis of hot plug connection, the video display apparatus 2 may carry out switching from the first mode to the second mode, display of the menu screen, or the like as well as the above.

Modification Example of (B) As a modification example, in case of the user setting state of the external video output off, a control as follows is allowed. In case of the setting state of the external video output off, the video display apparatus 2 applies the external apparatus information priority mode that is the first mode in any of (a) and (b). This intends to set to the first mode at first in accordance with the first mode as default.

Moreover, in a case where it is detected that an external apparatus positioned at the rear stage thereof is connected thereto in the state of the first mode described above, the video display apparatus 2 may automatically switch from the first mode to the second mode as well as the control of (B). Further, at that time, confirmation of the menu screen and a user operation may intermediate.

In this regard, even in a control form of each of (B) and the modification example of (B) described above, by an EDID transmission procedure based on the HDMI standards, the own EDID is provided, as the provided EDID, from the video display apparatus 2 to the video output apparatus 1 positioned at the front stage thereof. For that reason, determination of video data in the video output apparatus 1 becomes similar. As described above, in the first embodiment, the mode control function allows a suitable mode, in which priority is given to performance of the own apparatus or the external apparatus, to be applied in accordance with user intention, an actual connection status and the like.

[Mode_(2)]

A method of EDID transmission and a method of generating the provided EDID in each mode of the first mode and the second mode will be described with reference to FIG. 4 and FIG. 5.

FIG. 4 shows a method of the EDID transmission and the like in case of the first mode. As an example, (A) of FIG. 4 shows the case where the external video display apparatus 3 positioned at the rear stage thereof has lower performance than that of the video display apparatus 2, and (B) of FIG. 4 shows the case where the external video display apparatus 3 positioned at the rear stage thereof has higher performance. An example of resolution is shown as an example of the performance.

In the example of (A) of FIG. 4, the external video display apparatus 3 corresponds to XGA (Extended Graphics Array) and VGA as resolution indicated by the external EDID (applicable resolution, which will be described later), and corresponds to XGA as suitable resolution. In this regard, a mark [!!] that is double exclamation marks is a mark for indicating the suitable resolution in the specification of the present application (examples: "XGA[!!]"). The video display apparatus 2 corresponds to WXGA (Wide XGA), XGA, and VGA as resolution indicated by the own EDID, and corresponds to WXGA as suitable resolution. In a ranking relationship of resolution, resolution of the external apparatus is lower than that of the own apparatus (WXGA>XGA). In the example of (B) of FIG. 4, the external video display apparatus 3 corresponds to WXGA, XGA, and VGA as resolution indicated by the external EDID, and corresponds to XGA as suitable resolution. The video display apparatus 2 corresponds to XGA and VGA as resolution indicated by the own EDID, and corresponds to XGA as suitable resolution. In the ranking relationship of resolution, resolution of the external apparatus is higher than that of the own apparatus (XGA<WXGA).

FIG. 4 shows some generating methods as shown in (1A) to (1C) described below as the method of generating the provided EDID in the first mode according to the first embodiment. The video display apparatus 2 determines provided EDID by using (1A), (1B) or (1C) in the first mode. (A) of FIG. 4 shows examples of (1A) and (1B). (B) of FIG. 4 shows an example of (1C).

(1A) The video display apparatus 2 sets the parameter value of the external EDID obtained from the external apparatus positioned at the rear stage thereof (examples: XGA, VGA) to provided EDID as it is.

(1B) The video display apparatus 2 carries out a logical product (AND) process that is a process to take a common value in apparatus information of the external EDID obtained from the external apparatus positioned at the rear stage thereof and the own EDID of the own apparatus, and sets the common value (examples: XGA, VGA) to provided EDID. In this regard, suitable resolution is also set to this common value (examples: XGA[!!]). The suitable resolution of this common value indicates suitable one in the video display apparatus 2 and the external video display apparatus 3 that are the two apparatus, and particularly indicates suitable one of the external video display apparatus 3.

(1C) The video display apparatus 2 refers to information of both the external EDID obtained from the external apparatus positioned at the rear stage thereof and the own EDID. In a case where the external apparatus has higher performance (examples: XGA<WXGA), the video display apparatus 2 carries out a logical addition (OR) process that is a process to take both values of a value of the external EDID and a value of the own EDID, and sets the both values (examples: WXGA, XGA, VGA) to provided EDID. In this regard, suitable resolution is also set in these both values examples: WXGA[!!]).

The video output apparatus 1 determines video data to be outputted on the basis of information of the resolution and the like contained in the obtained EDID based on each of (1A) to (1C) described above. For example, in case of (A) of FIG. 4, it is determined that resolution is video data of XGA. In case of (B) of FIG. 4, it is determined that resolution is video data of WXGA.

As shown in (1A) to (1C) of FIG. 4 described above, in the first mode, the apparatus information containing the parameter value of the external EDID that gives priority to performance and specification of the external apparatus compared with the own apparatus is transmitted to the video output apparatus 1 positioned at the front stage thereof. In this regard, in case of (1C), information that the own apparatus does not have but only the external apparatus has (for example, in (B) of FIG. 4, WXGA representing high performance) is contained in the provided EDID. Therefore, it can be said that in case of (1C), the apparatus information that gives priority to the external apparatus is transmitted to the front stage thereof.

FIG. 5 shows a method of the EDID transmission and the like in case of the second mode. As an example, (A) of FIG. 5 shows the case where the external video display apparatus 3 positioned at the rear stage thereof has lower performance than that of the video display apparatus 2, and (B) of FIG. 5 shows the case where the external video display apparatus 3 positioned at the rear stage thereof has higher performance. An example of resolution is shown as an example of the performance.

In the example of (A) of FIG. 5, the external video display apparatus 3 corresponds to XGA and VGA as resolution indicated by the external EDID, and corresponds to XGA as suitable resolution. The video display apparatus 2 corresponds to WXGA, XGA, and VGA as resolution indicated by the own EDID, and corresponds to WXGA as suitable resolution. In a ranking relationship of resolution, resolution of the external apparatus is lower than that of the own apparatus (WXGA>XGA). In the example of (B) of FIG. 5, the external video display apparatus 3 corresponds to WXGA, XGA, and VGA as resolution indicated by the external EDID, and corresponds to WXGA as suitable resolution. The video display apparatus 2 corresponds to XGA and VGA as resolution indicated by the own EDID, and corresponds to XGA as suitable resolution. In the ranking relationship of resolution, resolution of the external apparatus is higher than that of the own apparatus (XGA<WXGA).

FIG. 5 shows some generating methods as shown in (2A) to (2C) described below as the method of generating the provided EDID in the second mode according to the first embodiment. The video display apparatus 2 determines provided EDID by using (2A), (2B) or (2C) in the second mode. (A) and (B) of FIG. 5 respectively show examples of (2A) and (2B).

(2A) The video display apparatus 2 sets the parameter value of the own EDID (examples: WXGA, XGA, VGA) to provided EDID as it is regardless of the parameter value of the external EDID obtained from the external apparatus positioned at the rear stage thereof (examples: XGA, VGA). In a case where there are plural kinds of applicable resolution in the own EDID, for example, the maximum resolution (or resolution that is not the maximum but is set to suitable) is set in the provided EDID as the suitable resolution (examples: WXGA[!!]).

(2B) The video display apparatus 2 refers to both values in the apparatus information of the external EDID obtained from the external apparatus positioned at the rear stage thereof and the own EDID. As shown in (A) of FIG. 5, in a case where the external apparatus has lower performance than that of the own apparatus, for example, in a case where resolution thereof is lower (examples: WXGA>XGA), the video display apparatus 2 carries out a process described below from the both values. Namely, the video display apparatus 2 carries out a logical addition (OR) process that is a process to comprehensively take both values from the external EDID and the own EDID, and sets the both values (examples: WXGA, XGA, VGA) to provided EDID. In this regard, suitable resolution is also set in these both values (examples: WXGA [!!]). The suitable resolution of these both values indicates suitable one in the video display apparatus 2 and the external video display apparatus 3 that are two apparatuses, and particularly indicates suitable one of the own apparatus.

(2C) Although it is not shown in the drawings, the video display apparatus 2 may use a generating method described below. The video display apparatus 2 refers to both values of the external EDID and the own EDID, and carries out a process to select one or more suitable value for the own apparatus between the both values. The video display apparatus 2 set the selected value to provided EDID. For example, the video display apparatus 2 may select only its own suitable resolution (examples: WXGA) from the both values, and set it to the provided EDID.

Similarly, in case of (B) of FIG. 5, (2A) to (2C) are satisfied. In case of (2A), the video display apparatus 2 sets the parameter value of the own EDID (examples: XGA, VGA) to provided EDID as it is regardless of the parameter value of the external EDID (examples: WXGA and the like). In case of (2B), the video display apparatus 2 refers to the both values of the external EDID and the own EDID. In a case where the external apparatus has higher performance than that of the own apparatus, for example, in a case where resolution thereof is higher (examples: XGA<WXGA), the video display apparatus 2 carries out a process as follows. Namely, the video display apparatus 2 sets both values of the external EDID and the own EDID (examples: WXGA, XGA, VGA) to provided EDID. In this regard, suitable resolution is also set in these both values (examples: XGA [!!]). The suitable resolution of these both values particularly indicates suitable one of the own apparatus. In case of (1C), the video display apparatus 2 select one or more suitable value for the own apparatus by predetermined determination between the both values of the external EDID and the own EDID, and sets the selected value (examples: WXGA, XGA[!!], VGA) to the provided EDID.

The video output apparatus 1 determines video data to be outputted on the basis of information of the resolution and the like contained in the obtained EDID based on any of (2A) to (2C) described above. For example, in case of (A) of FIG. 5, the resolution is determined to video data with WXGA. In case of (B) of FIG. 5, the resolution is determined to video data with XGA.

As shown in (2A) to (2C) described above, in the second mode, the apparatus information containing the parameter value of the own EDID that gives priority to performance and specification of the own apparatus compared with the external apparatus is transmitted to the video output apparatus 1 positioned at the front stage thereof. In this regard, in case of (2B), information that the external apparatus does not have but only the own apparatus has (for example, in (A) of FIG. 4, WXGA representing high performance) is contained in the provided EDID. Therefore, it can be said that in case of (2B), the apparatus information that gives priority to the own apparatus is transmitted to the front stage thereof.

In this regard, in the video display apparatus 2 according to the modification example, any one or two of (1A) to (1C)

may be used in the first mode, and any one or two of (2A) to (2C) may be used in the second mode. By combination of the first mode and the second mode, various kinds of combination in the generating method is allowed.

[First Mode_Connection Example]

Figure 6:
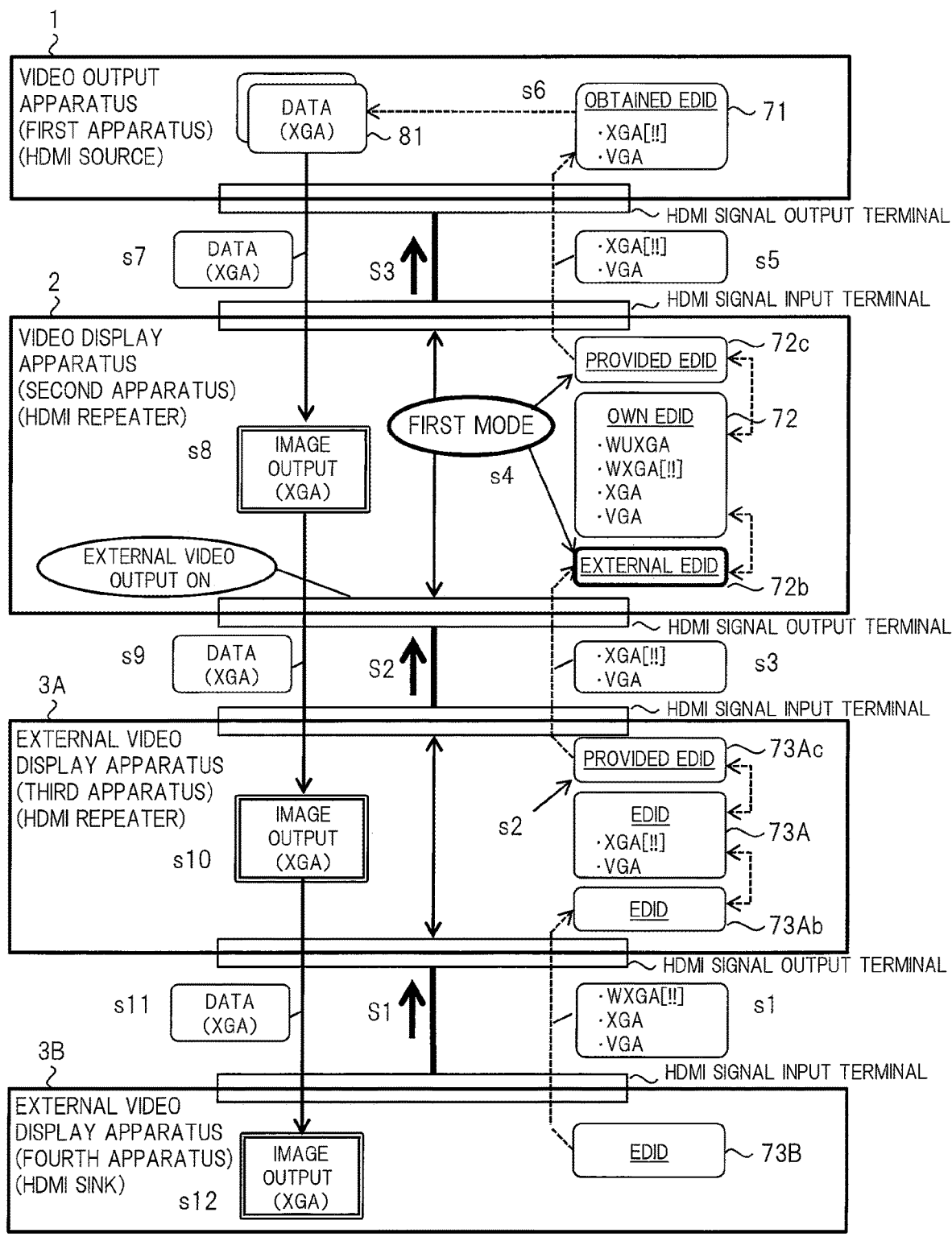
FIG. 6 is a view showing an apparatus connection example according to the first embodiment, that is, a sequence containing an example of the EDID transmission and video output in case of the first mode.

FIG. 6 shows an apparatus connection example according to the first embodiment, that is, a sequence containing an example of the EDID transmission and the video output in case of the first mode. An example of connection so as to be tied in a row in a video display system shown in FIG. 6 is as follows. The video output apparatus 1 that is a first apparatus, the video display apparatus 2 that is a second apparatus, a first external video display apparatus 3A that is a third apparatus, and a second external video display apparatus 3B that is a fourth apparatus are connected in series in this order from a source side. The external video display apparatus 3A corresponds to an HDMI repeater, and the external video display apparatus 3B corresponds to an HDMI sink.

An example of connection order of a plurality of apparatuses is as follows. First, the fourth apparatus is connected to the third apparatus at connection S1. Subsequently, the third apparatus is connected to the second apparatus at connection S2. Subsequently, the second apparatus is connected to the first apparatus at connection S3. An influence of connection order will be described later.

Connection between two adjacent apparatuses is HDMI connection. In a case where an HDMI cable is connected to each of an HDMI signal output terminal or an HDMI signal input terminal, an HDMI transmission interface unit or an HDMI reception interface unit of each apparatus detects and recognizes its connection automatically. Then, the HDMI transmission interface unit or the HDMI reception interface unit of each apparatus carries out a procedure such as apparatus authentication and EDID transmission between connected apparatuses. EDID transmission at the time of detection of a hot plug signal will be described later.

The video output apparatus 1 includes a function configured to output video data from predetermined low resolution to high resolution as multimedia data. The video output apparatus 1 contains data 81 as the video data, and resolution of the data 81 is XGA.

An example of EDID held in each apparatus is as follows. The video display apparatus 2 that is the second apparatus includes four types of resolution of {WUXGA (Wide Ultra XGA), WXGA, XGA, VGA} ("applicable resolution", which will be described later) as own EDID 72. Its own suitable resolution is WXGA. The external video display apparatus 3A that is the third apparatus includes two types of resolution of {XGA, VGA} as EDID 73A, and suitable resolution thereof is XGA. The external video display apparatus 3B that is the fourth apparatus includes three types of resolution of {WXGA, XGA, VGA} as EDID 73B, and suitable resolution thereof is WXGA.

[First Mode_EDID Transmission Example]

A procedure and an example to transmit EDID and determine video data in the first mode will be described with reference to FIG. 6. FIG. 6 includes Steps s1 to s12. Hereinafter, it will be described in order of Steps. As a premise, the video display apparatus 2 is in a user setting state of the external video output on and the first mode.

(s1) When the third apparatus and the fourth apparatus are connected by the connection S1, the external video display apparatus 3A reads out the EDID 73B {WXGA[!!], XGA, VGA} from the external video display apparatus 3B on the basis of the procedure of the EDID transmission of HDMI to obtain it as EDID 73Ab.

(s2) The external video display apparatus 3A takes, by the EDID 73Ab and its own EDID 73A, a common value (examples: XGA, VGA), for example, and constitutes provided EDID 73Ac {XGA [!!], VGA} containing its common value.

(s3) When the second apparatus and the third apparatus are connected by the connection S2, the HDMI transmission interface unit 62B of FIG. 2 reads out the provided EDID 73Ac {XGA[!!], VGA} from the external video display apparatus 3A via the HDMI signal output terminal of the video display apparatus 2 on the basis of the procedure of the EDID transmission of HDMI in the first mode, and obtains it as external EDID 72b. In a case of being viewed from the external video display apparatus 3A, the HDMI reception interface unit 63A transmits the provided EDID 73Ac to the video display apparatus 2 via the HDMI signal input terminal of the external video display apparatus 3A.

(s4) The video display apparatus 2 constitutes, by the external EDID 72b and the own EDID 72, provided EDID by using the generating method of (1A), (1B) or (1C) described above. For example, the video display apparatus 2 takes, by the external EDID 72b and the own EDID 72, the common value (examples: XGA, VGA) on the basis of (1B), and constitutes provided EDID 72c {XGA[!!], VGA} containing the common value.

(s5) When the first apparatus and the second apparatus are connected by the connection S3, the video output apparatus 1 reads out the provided EDID 72c {XGA[!!], VGA} from the video display apparatus 2 on the basis of the procedure of the EDID transmission of HDMI, and obtains it as obtained EDID 71. In a case of being viewed from the video display apparatus 2, the HDMI reception interface unit 62A transmits the provided EDID 72c to the video output apparatus 1 via the HDMI signal input terminal of the video display apparatus 2 on the basis of the procedure of the EDID transmission in the first mode. In this case, information on resolution {WUXGA, WXGA} with which the video display apparatus 2 is compliant but the external video display apparatus 3A is not compliant is not transmitted to the video output apparatus 1.

(s6) The video output apparatus 1 determines resolution of video data to be outputted as a video in view of a parameter value of the obtained EDID 71. The video output apparatus 1 determines resolution in view of one or more kinds of resolution and suitable resolution contained in the obtained EDID 71. In the HDMI standards, the video output apparatus 1 normally selects the maximum resolution among one or more kinds of resolution as candidates, which are contained in the EDID, on the basis of a predetermined ranking relationship. In the first embodiment, a value of suitable resolution is contained in the EDID transmitted between apparatuses, and the video output apparatus 1 gives top priority to the suitable resolution to select resolution. In the present embodiment, resolution of the video data is determined to XGA from XGA that is suitable resolution in the obtained EDID 71.

(s7) The video output apparatus 1 transmits the determined data 81 of resolution {XGA} from the HDMI transmission interface unit 61 to the video display apparatus 2 via the HDMI signal output terminal. The video display apparatus 2 receives the data 81 by the HDMI reception interface unit 62A via the HDMI signal input terminal.

(s8) The video display apparatus 2 outputs the data 81 from the HDMI reception interface unit 62A to the display unit 15 through the image processing IC 14 of FIG. 2. This causes the display unit 15 to display a video of the screen. The resolution to output this image becomes XGA. Suitable resolution compliant with the display unit 15 is WXGA. For that reason, in the first mode, the video display apparatus 2 outputs an image with XGA that has lower resolution than that of WXGA, and displays it with relatively low performance.

(s9) The video display apparatus 2 transmits the data 81 of resolution {XGA} from the HDMI transmission interface unit 62B to the external video display apparatus 3A via the HDMI signal output terminal. The external video display apparatus 3A receives the data 81 by the HDMI reception interface unit 63A via the HDMI signal input terminal.

(s10) The external video display apparatus 3A outputs the data 81 to a display unit to cause the display unit to output an image. The resolution to output this image becomes XGA. Suitable resolution compliant with the display unit of the external video display apparatus 3A is XGA. For that reason, in the external video display apparatus 3A, it is possible to realize suitable image output with XGA that is suitable resolution in the first mode.

(s11) The external video display apparatus 3A transmits the data 81 of resolution {XGA} from the HDMI transmission interface unit 63B to the external video display apparatus 3B via the HDMI signal output terminal. The external video display apparatus 3B receives the data 81 by the HDMI reception interface unit included in the external video display apparatus 3B via the HDMI signal input terminal.

(s12) The external video display apparatus 3B outputs the data 81 to the display unit to cause it to output an image. The resolution to output this image becomes XGA. Suitable resolution compliant with the display unit of the external video display apparatus 3B is WXGA. For that reason, in the first mode, the external video display apparatus 3B outputs an image with XGA that has lower resolution than that of WXGA, and displays it with relatively low performance.

As described above, in case of the first mode, as a result, it is possible to realize relatively high performance display while giving priority to performance of the external video display apparatus 3A that is the external apparatus. The external video display apparatus 3A becomes image output with the maximum resolution that is allowed for itself. Therefore, it becomes a suitable result for a user who views it by the external video display apparatus 3A.

On the other hand, as a result to give priority to the performance of the external apparatus, the video display apparatus 2 and the external video display apparatus 3B output the image with relatively low XGA regardless of allowing image output with WXGA as its own performance. It does not become suitable for a user who views it by the video display apparatus 2 and/or the external video display apparatus 3B in case of desiring high image quality as much as possible.

[Second Mode_Connection Example]

Figure 7:
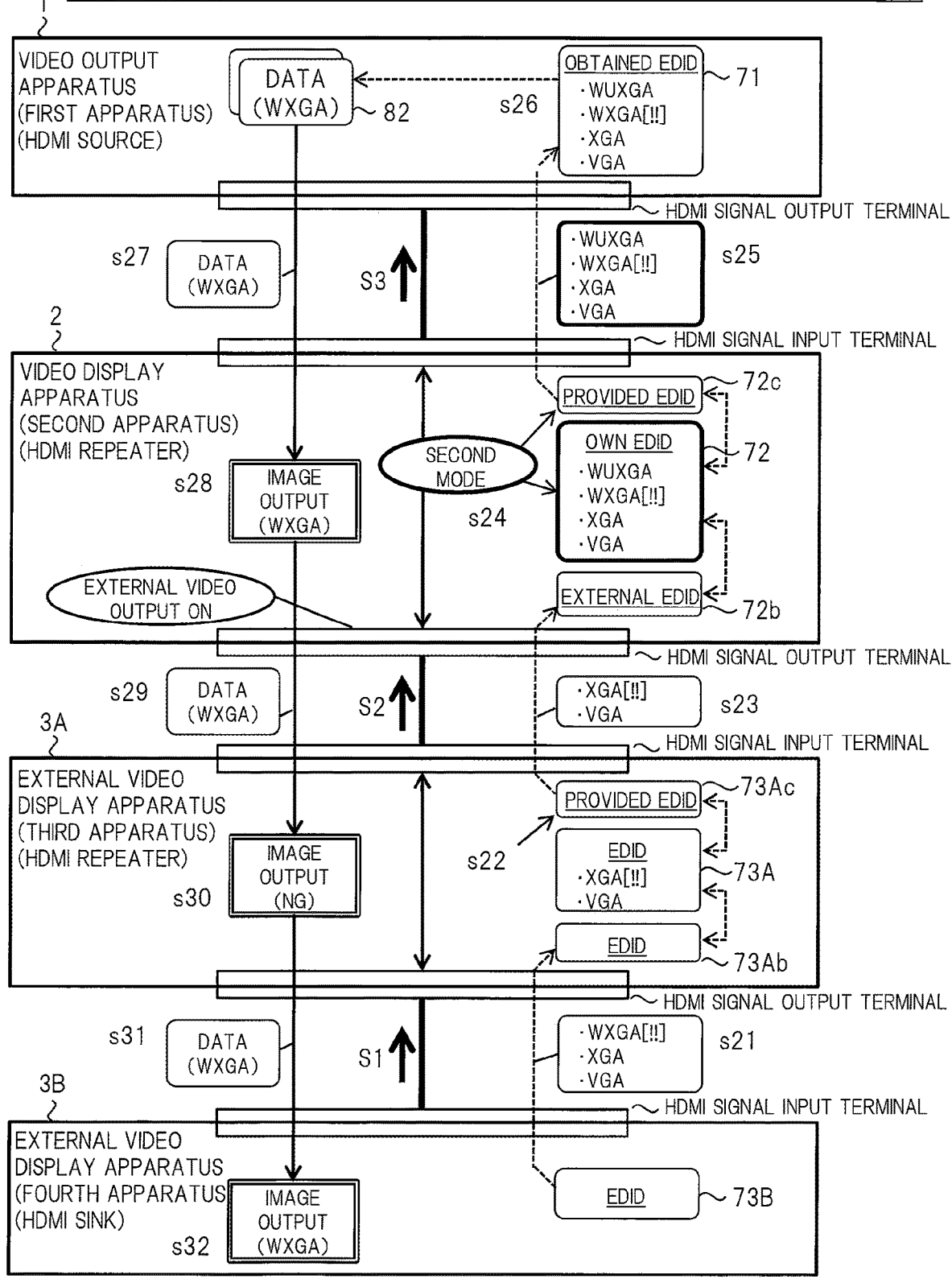
FIG. 7 is a view showing an apparatus connection example according to the first embodiment, that is, a sequence containing an example of the EDID transmission and the video output in case of the second mode.

FIG. 7 shows an apparatus connection example according to the first embodiment, that is, a sequence containing an example of EDID transmission and video output in case of the second mode. An example of connection so as to be tied in a row in a video display system shown in FIG. 7 is the same as the connection example shown in FIG. 6. An example of connection order of a plurality of apparatuses is the same as the connection S1 to the connection S3 of FIG. 6. The video output apparatus 1 includes the similar functions to those shown in FIG. 6, and contains data 82 as video data. Resolution of the data 82 is WXGA. An example of EDID held in advance by each of the apparatuses is the same as that of FIG. 6.

[Second Mode_EDID Transmission Example]

A procedure and an example to determine EDID transmission and video data in the second mode will be described with reference to FIG. 7. FIG. 7 includes Steps s21 to s32. Hereinafter, it will be described in order of Steps. As a premise, the video display apparatus 2 is in a user setting state of the external video output on and the second mode.

(s21 to s22) Steps s21 to s22 are similar to Steps s1 to s2 in FIG. 6. The external video display apparatus 3A constitutes provided EDID 73Ac containing XGA as suitable resolution.

(s23) When the second apparatus and the third apparatus are connected by the connection S2, the HDMI transmission interface unit 62B reads out the provided EDID 73Ac {XGA[!!], VGA} from the external video display apparatus 3A via the HDMI signal output terminal of the video display apparatus 2 on the basis of the procedure of the EDID transmission in the second mode, and obtains it as the external EDID 72b.

(s24) The video display apparatus 2 constitutes, by the external EDID 72b and the own EDID 72, provided EDID by using the generating method of (2A), (2B) or (2C) described above. For example, the video display apparatus 2 takes a value of the own EDID 72 {WUXGA, WXGA, XGA, VGA} on the basis of (2A) as provided EDID 72c. Suitable resolution contained in the provided EDID 72c is WXGA that is resolution capable of suitably outputting an image on the display unit 15 thereof.

(s25) When the first apparatus and the second apparatus are connected by the connection S3, the video output apparatus 1 reads out the provided EDID 72c {WUXGA, WXGA[!!], XGA, VGA} from the video display apparatus 2 on the basis of the procedure of the EDID transmission of HDMI, and obtains it as obtained EDID 71. In a case of being viewed from the video display apparatus 2, the HDMI reception interface unit 62A transmits the provided EDID 72c to the video output apparatus 1 via the HDMI signal input terminal of the video display apparatus 2 on the basis of the procedure of the EDID transmission in the second mode. In this case, information on resolution {WUXGA, WXGA} with which the video display apparatus 2 is compliant but the external video display apparatus 3A is not compliant is also transmitted to the video output apparatus 1.

(s26) As well as s6 of FIG. 6, the video output apparatus 1 determines resolution of video data to be outputted as a video in view of a parameter value of the obtained EDID 71. In the present embodiment, resolution of the video data is determined to WXGA from WXGA that is suitable resolution in the obtained EDID 71.

(s27) The video output apparatus 1 transmits the data 82 of the determined resolution {WXGA} from the HDMI transmission interface unit 61 to the video display apparatus 2 via the HDMI signal output terminal. The video display apparatus 2 receives the data 82 by the HDMI reception interface unit 62A via the HDMI signal input terminal.

(s28) The video display apparatus 2 outputs the data 82 from the HDMI reception interface unit 62A to the display unit 15 through the image processing IC 14. This causes the display unit 15 to display the video on the screen. The resolution to output this image becomes WXGA. For that reason, since the video display apparatus 2 becomes image output with suitable WXGA in the second mode, it is possible to realize relatively high performance display.

(s29) The video display apparatus 2 transmits the data 82 of resolution {WXGA} from the HDMI transmission interface unit 62B to the external video display apparatus 3A via the HDMI signal output terminal. The external video display apparatus 3A receives the data 82 by the HDMI reception interface unit 63A via the HDMI signal input terminal.

(s30) The external video display apparatus 3A outputs the data 82 to a display unit to cause it to output an image. However, suitable resolution for the display unit of the external video display apparatus 3A is XGA, and the display unit is not compliant with WXGA. Therefore, it is impossible to output the image with WXGA (indicated as "NG"). For that reason, in the external video display apparatus 3A, it is impossible to realize suitable image output with XGA in the second mode. In this regard, in a case where the external video display apparatus 3A is provided with means for converting into data with low resolution on the basis of data with high resolution, that is, means for down-converting, there is a possibility that the external video display apparatus 3A can output an image with XGA.

(s31) The external video display apparatus 3A transmits the data 82 of resolution {WXGA} from transmission interface unit 63B to the external video display apparatus 3B via the HDMI signal output terminal. The external video display apparatus 3B receives the data 82 by the HDMI reception interface unit included in the external video display apparatus 3B via the HDMI signal input terminal. In this regard, there is a possibility that the data 82 of resolution {WXGA} cannot be outputted from a transmitting unit of the external video display apparatus 3A to the external video display apparatus 3B positioned at the rear stage thereof. In such a case, the image output becomes a result of NG even in the external video display apparatus 3A. In the present embodiment, it is the case where it can be outputted to the rear stage thereof.

(s32) The external video display apparatus 3B outputs the data 82 to the display unit to cause it to output an image. The resolution to output this image becomes WXGA. Suitable resolution compliant with the display unit of the external video display apparatus 3B is WXGA. For that reason, in the external video display apparatus 3B, it is possible to realize image output with suitable WXGA in the second mode.

As described above, in case of the second mode, as a result, it is possible to realize relatively high performance display while giving priority to performance of the video display apparatus 2 that is the own apparatus. Therefore, it becomes a suitable result for a user who views it by the video display apparatus 2.

On the other hand, a result to give priority to the performance of the own apparatus, the external video display apparatus 3A cannot realize image output with XGA regardless of allowing image output with XGA as its own performance. It does not become suitable for a user who views it by the external video display apparatus 3A.

In this regard, it is assumed a possibility that it is impossible to output a suitable image in the external apparatus positioned at the rear stage thereof when to output a video to the external apparatus positioned at the rear stage thereof like s30, s31 described above. In view of it, the video display apparatus 2 includes a function to carry out a control operation to stop a signal of the video output to the external apparatus positioned at the rear stage thereof (will be described later).

In this regard, as a modification example, a form in which suitable resolution is not described in EDID to be transmitted between apparatuses is allowed. In such a case, the video output apparatus 1 can determine resolution from one or more kinds of applicable resolution in obtained EDID 71, for example, on the basis of a predetermined ranking relationship in a system to select the maximum resolution.

[EDID]

Figure 8:
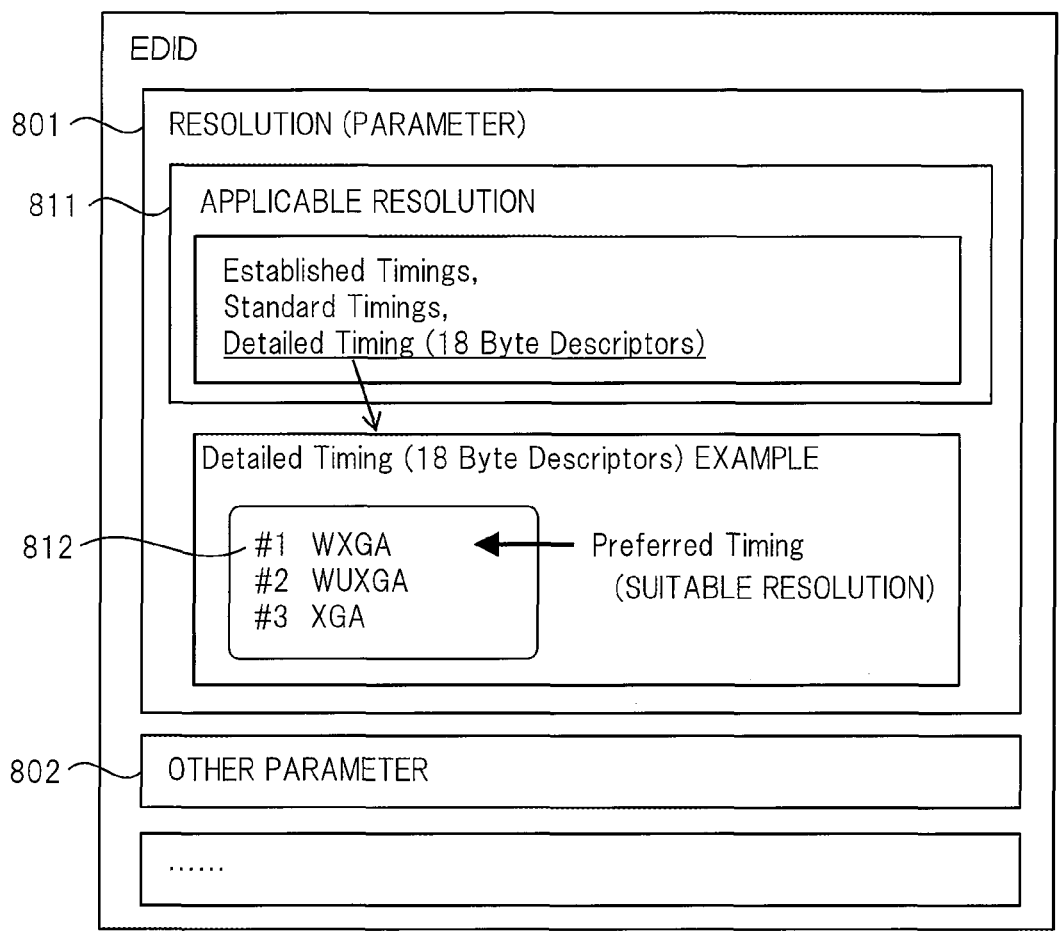
FIG. 8 is a view showing a configuration of EDID according to the first embodiment.

FIG. 8 shows a detailed configuration of the EDID transmitted between apparatuses. The EDID contains plural kinds of parameter values each of which represents specification or performance of an apparatus. The EDID of FIG. 8 contains one resolution 801 and another parameter 802 as parameters. An applicable resolution 811 is included in a block of the resolution 801. Moreover, a suitable resolution 812 is included in a block of the applicable resolution 811. The suitable resolution 812 is also called as output device corresponding resolution.

For details, "Established Timings", "Standard Timings", "Detailed Timing (18 Byte Descriptors)", and the like are defined in the block of the applicable resolution 811. Among them, one or more kinds of resolution is described in the "Detailed Timing" block together with a ranking. In the example of FIG. 8, three types of resolution are described in the "Detailed Timing" block in order of "#1 WXGA, #2 WUXGA, #3 XGA". "#1" and the like represent ranking. Resolution described in "#1" at the first place in the "Detailed Timing" block is "Preferred Timing" in the suitable resolution 812. This "Preferred Timing" represents resolution by which suitable image output is allowed in accordance with an output device of the own apparatus (the display unit 15 in the video display apparatus 2). This example corresponds to the example of the EDID transmitted at s25 of FIG. 7.

Each of the apparatuses including the video display apparatus 2 transmits the EDID containing both the applicable resolution 811 and the suitable resolution 812 when to transmit the EDID. The video display apparatus 2 according to the first embodiment holds the own EDID 72 containing the suitable resolution 812 described above in the nonvolatile memory 13 in advance. The video display apparatus 2 constitutes the provided EDID 72c by using the own EDID 72 containing the suitable resolution 812 described above so that suitable image output and high performance display are allowed in the own apparatus at the time of the second mode. This makes it possible to consider and reflect a parameter value of the own EDID 72 containing the suitable resolution 812 described above when to determine resolution in the video output apparatus 1. Therefore, it is easy to realize the suitable image output and the high performance display by the own apparatus.

In this regard, plural kinds exist as resolution like the examples described above, but a predetermined ranking relationship is defined in advance. For example, a ranking (or order) such as WUXGA>WXGA>XGA is set as high and low of resolution. This is a ranking in terms of capable of outputting an image with high definition. The video output apparatus 1 selects and determines resolution of video data to be outputted on the basis of the ranking relationship.

[HDMI Connection and HDMI-EDID Transmission Procedure]

FIG. 9 is a view for explaining HDMI connection between the video output apparatus 1 as an HDMI source, the video display apparatus 2 as an HDMI sink, and an EDID transmission procedure between the apparatuses.

The EDID transmission procedures between two adjacent connection apparatuses are roughly classified into procedures in two cases of (A) the case where the video output apparatus 1 mainly obtains EDID from the video display apparatus 2, and (B) the case where the video display apparatus 2 mainly transmits EDID to the video output apparatus 1.

FIG. 9 shows the video output apparatus 1 that is positioned at a transmission side on the left side, and the video display apparatus 2 that is positioned at a reception side on the right side, and HDMI signal input/output terminals of these apparatuses are connected by HDMI cables. The HDMI transmission interface unit 61 of the video output apparatus 1 includes a transmitting unit corresponding to the HDMI signal output terminal. The HDMI reception interface unit 62A of the video display apparatus 2 includes a receiving unit corresponding to the HDMI signal input terminal.

These HDMI cables respectively have a plurality of signal lines and parameters corresponding to the signal lines. These HDMI cables respectively have TMDS, DDC, "+5V Power", and "Hot Plug Detect" as signal lines and parameters related to the EDID transmission procedure.

The TMDS is a signal line for one direction for transmitting a digital signal of multimedia data containing a video, an audio, a command and the like. The DDC is a signal line for two directions for reading out the EDID and the like and carrying out communication. The "+5V Power" ("signal line for indication of intention to read out") is a signal line for one direction, which is used for the transmission side to indicate intention to readout to the reception side. The "Hot Plug Detect" ("detection of hot plug" and "signal line for permission to readout and display of change") is a signal line for one direction, which is used for permission to read out and display of change at the reception side. The phrase "display of change" indicates that intention to change EDID is indicated to the transmission side.

Hereinafter, the EDID transmission procedure in FIG. 9 is shown.

The case where the video output apparatus 1 that is positioned at the transmission side read out EDID from the video display apparatus 2 that is positioned at the reception side is as follows. The video output apparatus 1 supplies an on signal (a voltage value is High) corresponding to the indication of intention to read out to the video display apparatus 2 through the "+5V Power" signal line, and monitors a state of the "Hot Plug Detect" signal line. In case of permitting to read out EDID, the video display apparatus 2 supplies an on signal indicating permission to read out (a voltage value is High) through the "Hot Plug Detect" signal line. In a case where the "Hot Plug Detect" signal line becomes the on signal, the video output apparatus 1 can determine that it is permitted to read out at the reception side. In such a case, the video output apparatus 1 reads out the EDID from the video display apparatus 2 by using the DDC. The video display apparatus 2 transmits the EDID (the provided EDID described above) by using the DDC.

The case where the video display apparatus 2 transmits indication of intention to change EDID to the video output apparatus 1 is as follows. As a premise, reading out of EDID from the video display apparatus 2 by the video output apparatus 1 is completed once. For that reason, the "+5V Power" signal line is in a state that the on signal is supplied. When to indicate intention to change the EDID, the video display apparatus 2 sets the "Hot Plug Detect" signal line to an off signal (a voltage value is Low) for a period of time of 100 msec or longer, and then returns it to the on signal again. The video output apparatus 1 reads out the EDID from the video display apparatus 2 by using the DDC after the change is recognized by the "Hot Plug Detect" signal line.

[Another Connection Example]

A difference of the connection order in the three kinds of apparatuses of FIG. 1 will be described supplementarily. In the connecting the three apparatuses of FIG. 1 so as to be tied in a row, there is a first case in which the external video display apparatus positioned at the rear stage thereof is first connected to the video display apparatus 2 and the video output apparatus 1 positioned at the front stage thereof is next connected thereto, and a second case in which the video output apparatus 1 positioned at the front stage thereof is first connected thereto and the external video display apparatus 3 positioned at the rear stage thereof is next connected thereto. FIG. 6 and FIG. 7 showed the examples corresponding to the first case. Even in the second case, the similar operation and result to those of the first case are realized basically.

Hereinafter, an operation outline of the video display apparatus 2 of the first case and the second case in case of each mode will be described together with concrete examples.

(First Case) The First Case is as Follows.

(1-1) The case of the first mode in the first case is as follows. The video display apparatus 2 obtains external EDID (examples: XGA) from an external apparatus that is connected to a rear stage thereof through a DDC by HDMI connection, and stores it in the storing unit 12. The video display apparatus 2 constitutes provided EDID on the basis of the external EDID and own EDID (examples: WXGA) by the generating method of the first mode described above, and stores it in the storing unit 12 or the memory 51. The provided EDID is (1A) the external EDID, (1B) a common value, or (1C) both values. Next, the video output apparatus 1 is connected to a front stage of the video display apparatus 2 by the HDMI connection. In a case where indication of intention to read out is received, the video display apparatus 2 transmits the provided EDID stored in the storing unit 12 or the memory 51 to the video output apparatus 1 through the DDC. Herewith, the video output apparatus 1 determines resolution of video data to be outputted as XGA on the basis of obtained EDID, for example. In this regard, since the EDID stored in the storing unit 12 or the memory 51 is held for at least a fixed time or longer, it can be reused.

(1-2) The case of the second mode in the first case is as follows. The video display apparatus 2 obtains external EDID (examples: XGA) from an external apparatus that is connected to a rear stage thereof by HDMI connection, and stores it in the storing unit 12. The video display apparatus 2 constitutes provided EDID on the basis of the external EDID and own EDID (examples: WXGA) by the generating method of the second mode described above, and stores it in the storing unit 12 or the memory 51. The provided EDID is (2A) own EDID, (2B) both values, or (2C) a selected value. Next, the video output apparatus 1 is connected to a front stage of the video display apparatus 2 by HDMI connection. In a case where indication of intention to read out is received, the video display apparatus 2 transmits the provided EDID stored in the storing unit 12 or the memory 51 to the video output apparatus 1. Herewith, the video output apparatus 1 determines resolution of video data to be outputted to WXGA on the basis of obtained EDID, for example.

(Second Case) The Second Case is as Follows.

(2-1) The case of the first mode in the second case is as follows. The video display apparatus 2 transmits own EDID (examples: WXGA) of the nonvolatile memory 13 to the video output apparatus 1 that is connected to a front stage thereof by HDMI connection through DDC as provided EDID. The video output apparatus 1 determines resolution of video data to be outputted to WXGA on the basis of obtained EDID, for example. Before the own EDID of the nonvolatile memory 13 is transmitted, it may temporarily be stored in the storing unit 12 or the memory 51 as the provided EDID.

Next, in a case where an external video output apparatus 3 is connected to a rear stage of the video display apparatus 2 by HDMI connection, the video display apparatus 2 obtains external EDID (examples: XGA) from the external apparatus, and stores it in the storing unit 12. The video display apparatus 2 similarly constitutes provided EDID (examples: XGA) on the basis of the external EDID and the own EDID by the generating method of the first mode, and updates the provided EDID stored in the storing unit 12 or the memory 51. Since the relation of connection and the provided EDID are changed, the video display apparatus 2 transmits the provided EDID stored in the storing unit 12 or the memory 51 to the video output apparatus 1 that is connected to a front stage thereof. Herewith, the video output apparatus 1 determines resolution of video data to be outputted to XGA on the basis of obtained EDID, for example. Namely, the resolution of the video data to be outputted is changed from WXGA to XGA.

(2-2-a) The case of the second mode in the second case is as follows. The video display apparatus 2 transmits own EDID (examples: WXGA) of the nonvolatile memory 13 to the video output apparatus 1 that is connected to the front stage thereof by the HDMI connection as provided EDID. Before the own EDID of the nonvolatile memory 13 is transmitted, it may temporarily be stored in the storing unit 12 or the memory 51 as the provided EDID. The video output apparatus 1 determines resolution of video data to WXGA, for example.

Next, in a case where the external video output apparatus 3 is connected to a rear stage of the video display apparatus 2 by HDMI signal, the video display apparatus 2 obtains external EDID (examples: XGA) from the external apparatus, and stores it in the storing unit 12. The video display apparatus 2 similarly constitutes provided EDID (examples: WXGA) on the basis of the external EDID and the own EDID by the generating method of the second mode, and stores it in the storing unit 12 or the memory 51. In a case where provided EDID, which has already been constituted by the own EDID, is stored in the storing unit 12 or the memory 51, the provided EDID is updated by the newly constituted EDID. Since the relation of connection is changed, the video display apparatus 2 carries out display of change to the video output apparatus 1 that is connected to the front stage thereof, and transmits the provided EDID stored in the storing unit 12 or the memory 51. The content of the provided EDID is not changed as it is WXGA. The video output apparatus 1 determines the resolution of video data to WXGA on the basis of obtained EDID, for example. This is not changed as it is WXGA that is determined at the time of the first connection.

(2-2-b) As a modification example, the following is also allowed as a control operation different from (2-2-a) described above. A first connection of a front stage thereof is similar. Next, in a case where the external video output apparatus 3 is connected to a rear stage of the video display apparatus 2 by an HDMI signal, the video display apparatus 2 obtains external EDID (examples: XGA) from the external apparatus, and stores it in the storing unit 12. the video display apparatus 2 similarly constitutes provided EDID (examples: WXGA) on the basis of the external EDID and own EDID by the generating method of the second mode, and stores it in the storing unit 12 or the memory 51. In a case where provided EDID, which has already been constituted by the own EDID, is stored in the storing unit 12 or the memory 51, the provided EDID is updated by the newly constituted EDID. Since the relation of connection is changed but the content of the provided EDID is not changed as it is WXGA, the video display apparatus 2 omits transmission of the provided EDID to the video output apparatus 1 that is connected to the front stage thereof. More specifically, the signal of the "Hot Plug Detect" signal line of FIG. 9 is not changed. In this case, resolution of video data also remains as it is WXGA that has been determined at the time of first connection.

In this regard, in the first embodiment, the operation of (2-2-a) described above is automatically carried out on the basis of the "Hot Plug Detect" signal line of a. General HDMI of FIG. 9. As a result, the same information is retransmitted, but determination content at the HDMI source is not changed. However, in this case, it is assumed a possibility that the retransmission causes a video by outputting an image by the own apparatus to be interrupted for a short time temporarily. Thus, in case of removing the possibility, (2-2-b) described above may be adopted so as not to retransmit the same EDID information.

[External Video Output Control Operation]

A control operation for external video output to an external apparatus positioned at a rear stage from the video display apparatus 2 that is the own apparatus will be described. As a result of giving priority to high performance display in the own apparatus by the second mode described above, there is a possibility that the external apparatus positioned at the rear stage thereof becomes image output impossible (NG) or low performance display like the example of FIG. 7. In the first embodiment, this possibility is dealt with by the control operation for the external video output as follows.

(1) In a case where the external apparatus positioned at the rear stage thereof becomes image output impossible or the like in the second mode and the video display apparatus 2 is in a state that an image can be outputted, a menu screen can be displayed on the basis of a user operation and a user setting state can be changed from the second mode to the first mode on the menu screen. This makes it possible to set to a state that priority is given to performance of the external apparatus positioned at the rear stage thereof as the first mode. Therefore, it is possible to set to a state that an image can be outputted in the external apparatus positioned at the rear stage thereof.

(2) In a case where the video display apparatus 2 is in a no image output state such as a stand-by state or an error state due to failure or the like, it is set to the first mode like FIG. 3. This makes it possible to become a state that an image can be outputted in the external apparatus positioned at the rear stage thereof. In this regard, the stand-by state is a state to shift to a black display screen and low power consumption state on the basis of determination that a fixed time elapses, for example.

(3) In a case where the video display apparatus 2 becomes the no image output state such as the error state but video output from an HDMI signal output terminal can be continued, the video output is continued.

In this regard, as examples of the error state such as failure, device failure of the display unit 15 (for example, extinction of a light source and failure of a display element), circuit failure of the image processing IC 14, and corruption of a digital signal are cited.

(4) In a case where an external apparatus is connected to a rear stage thereof by a user setting state of external video output off and an error such as failure occurs in the own apparatus to become an error state, thereby becoming a no image output state, then the video display apparatus 2 may switch from a setting state of the external video output on to a setting state of the external video output off.

(5) In a case where the video display apparatus 2 becomes a no image output state due to the error state described above, an off-control operation that is an external video output control operation as described below is allowed.

FIG. 10 shows a table in which off-control operations each of which is the external video output control operation are put together. A left column thereof shows the first mode or the second mode as a state of a mode in the own apparatus. A right column thereof shows off-control operations each of which is the external video output control operation in a case where the own apparatus becomes an error state or a no image output state. In the first embodiment, "AV-OFF", "AV-MUTE", and "AV-ERROR" are allowed as three kinds of off-control operations. A mark "o" indicates that it can be selected. The video display apparatus 2 carries out an off-control operation selected from them in accordance with design in advance or user setting. The video display apparatus 2 may use a plurality of off-control operations properly in accordance with a status, an error type or the like.

(5-1) The "AV-OFF" (AV signal stop) means that output or transmission of an AV signal (a digital signal of multimedia data) from an own apparatus to an external apparatus positioned at a rear stage thereof is stopped. In this case, the external apparatus positioned at the rear stage thereof cannot output an image in its own apparatus because the AV signal does not come from the video display apparatus 2 positioned at a front stage thereof.

(5-2) The "AV-MUTE" (AV mute signal output) means that output of an AV signal from an own apparatus to an external apparatus positioned at a rear stage thereof is continued but the AV signal is set to a mute signal in which the content of a video and/or an audio is changed into a black signal, a blank signal or the like. In this case, the external apparatus positioned at the rear stage thereof displays a black display screen, for example, because an image corresponding to the mute signal from the video display apparatus 2 positioned at a front stage thereof is outputted in its own apparatus.

(5-3) The "AV-ERROR" (AV error signal output) means that a predetermined error signal is outputted as an AV signal from an own apparatus to an external apparatus positioned at a rear stage thereof. This error signal is a signal for notifying the external apparatus positioned at the rear stage thereof of an error state such as failure of the video display apparatus 2 to cause the external apparatus positioned at the rear stage thereof to output a screen or an audio. In this case, for example, the external apparatus positioned at the rear stage thereof outputs, as an image, the error signal from the video display apparatus 2 positioned at a front stage thereof, whereby a predetermined message is displayed on the screen. The predetermined message is a message that it is in an error state such as failure of the video display apparatus 2 positioned at the front stage thereof, for example. This error signal may include a code according to a type of failure or the like. As an implementation example, the video display apparatus 2 hold information on error signals in a memory in advance. When the error state described above occurs, the video display apparatus 2 reads out an error signal to create a signal in which a message or the like is superimposed on a black screen by using an OSD function, and transmits it from the HDMI signal output terminal to the external apparatus positioned at the rear stage thereof.

By the external video output control operation described above, the user or a maintenance staff can recognize the error state of the video display apparatus 2 or the like in accordance with a state of the image output or the like in the external video display apparatus 3 positioned at the rear stage thereof, and this makes it possible to carry out a quick countermeasure operation. The user can recognize the error state of the video display apparatus 2 positioned at the front stage thereof or the like from a state that an image is not outputted in the external apparatus positioned at the rear stage thereof, the black display state, the message for the error, or the like. Further, it is possible to determine error details by using an apparatus manual or the like.

[Menu Screen and User Setting]

FIG. 11 shows an example of a menu screen and a user setting operation in the video display apparatus 2. This menu screen is a screen for receiving user setting, and includes items that allows switching of modes. In this regard, FIG. 11 shows the case where the video display apparatus 2 is a projector, for example. The video display apparatus 2 displays a menu screen as shown in FIG. 11 in a screen 1100 by using a projection display function and an OSD display function. This menu screen includes an item 1101 and an item 1102. A user carries out a user setting operation through this menu screen by using means such as a remote controller 1103 attached to a body of the video display apparatus 2. In this regard, any means for carrying out the similar user setting is included on an operation panel or the like of the body of the video display apparatus 2.

The item 1101 is an item through which user setting of external video output from the HDMI signal output terminal is allowed. In this item 1101, the setting is allowed by selecting whether to output data from the transmitting unit corresponding to the HDMI signal output terminal to the external video display apparatus 3 or not (the external video output on or the external video output off). In a case where the "external video output on" is selected in the item 1101, a mode can be set by the item 1102.

The item 1102 is an item through which user setting regarding EDID of an HDMI, which corresponds to the mode control function according to the first embodiment, is allowed. In this item 1102, the setting is allowed by selecting one from the first mode and the second mode. Default is set to the first mode.

In a case where the video display apparatus 2 operates normally, the user is allowed to carry out user setting via the menu screen at an arbitrary time, whereby it is possible to switch between the first mode and the second mode. The user may select the first mode in case of giving priority to performance of the external apparatus, and may select the second mode in case of giving priority to performance of the own apparatus.

[Apparatus State Display]

Figure 12:
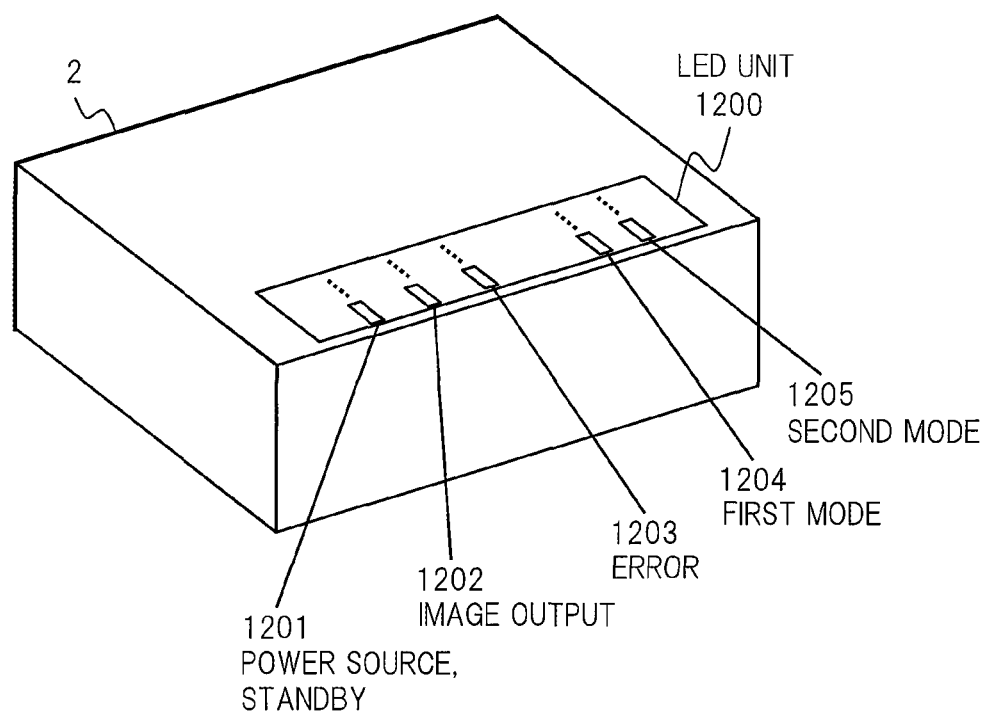
FIG. 12 is a view showing apparatus state display on a body thereof according to the first embodiment.

FIG. 12 shows apparatus state display on the body of the video display apparatus 2. FIG. 12 shows the case where the video display apparatus 2 is a projector, for example. An LED unit 1200 is provided on the body of the video display apparatus 2 as means for displaying an apparatus state. The LED unit 1200 includes a plurality of LED indicators. The LED unit 1200 displays various kinds of states of the apparatus by an LED lighting state as a user interface. This LED unit 1200 also displays a state of a mode. In the present embodiment, the LED unit 1200 includes an LED 1201 to an LED 1205. The LED 1201 represents a state of a power source or stand-by. The LED 1202 represents a state of image output or no image output. The LED 1203 represents a state of an error. The LED 1204 represents a state of the first mode. The LED 1205 represents a state of the second mode.

In a setting state of the external video output on, the video display apparatus 2 turns on the LED 1204 in the first mode, and turns on the LED 1205 in the second mode. The video display apparatus 2 turns off the LED 1204 and the LED 1205 at a setting state of the external video output off. This makes it possible for the user to intelligibly recognize the apparatus state including the state of the mode.

For example, when failure occurs in the state of the second mode, it becomes the stand-by state or the error state to become the no image output state. Each of the LEDs becomes a predetermined lighting state in response to them. In accordance with it, it is switched from the second mode to the first mode, thereby switching a lighting state of the LED 1205 in the second mode to a lighting state of the LED 1204 in the first mode.

[Effects and the Like]

As explained above, with the communication between the apparatuses of the system including the video display apparatus 2 according to the first embodiment, it is possible to relax restriction by the external EDID, and this makes it possible to realize suitable image output and the like with high performance by the own apparatus. In a case where the video output apparatus 1 is connected to the front stage of the video display apparatus 2 according to the first embodiment and the external video display apparatus 3 is connected to the rear stage thereof, the information containing the own EDID is provided to the apparatus positioned at the front stage thereof by the second mode of the mode control function at the time of the EDID transmission procedure. As a result, it is possible to contain the parameter value such as resolution in the own EDID into determination of the video output data by the video output apparatus 1. The video display apparatus 2 can relax restriction by specification or performance of the external apparatus, which is indicated by the external EDID of the rear stage thereof. It can be expected that the video output apparatus 1 carries out determination in preferential consideration of performance of the video display apparatus 2. For that reason, it is possible to realize image output with relatively high performance in the video display apparatus 2 compared with the prior art and the case of the first mode.

Second Embodiment

A video display apparatus 2 according to a second embodiment of the present invention will be described with reference to FIG. 13 to FIG. 14. A basic configuration according to the second embodiment is similar to that according to the first embodiment. Hereinafter, components according to the second embodiment different from those according to the first embodiment will be described. Since components for which there is no description particularly are the same as those according to the first embodiment, their explanation will be omitted.

[Video Display Apparatus]

Figure 13:
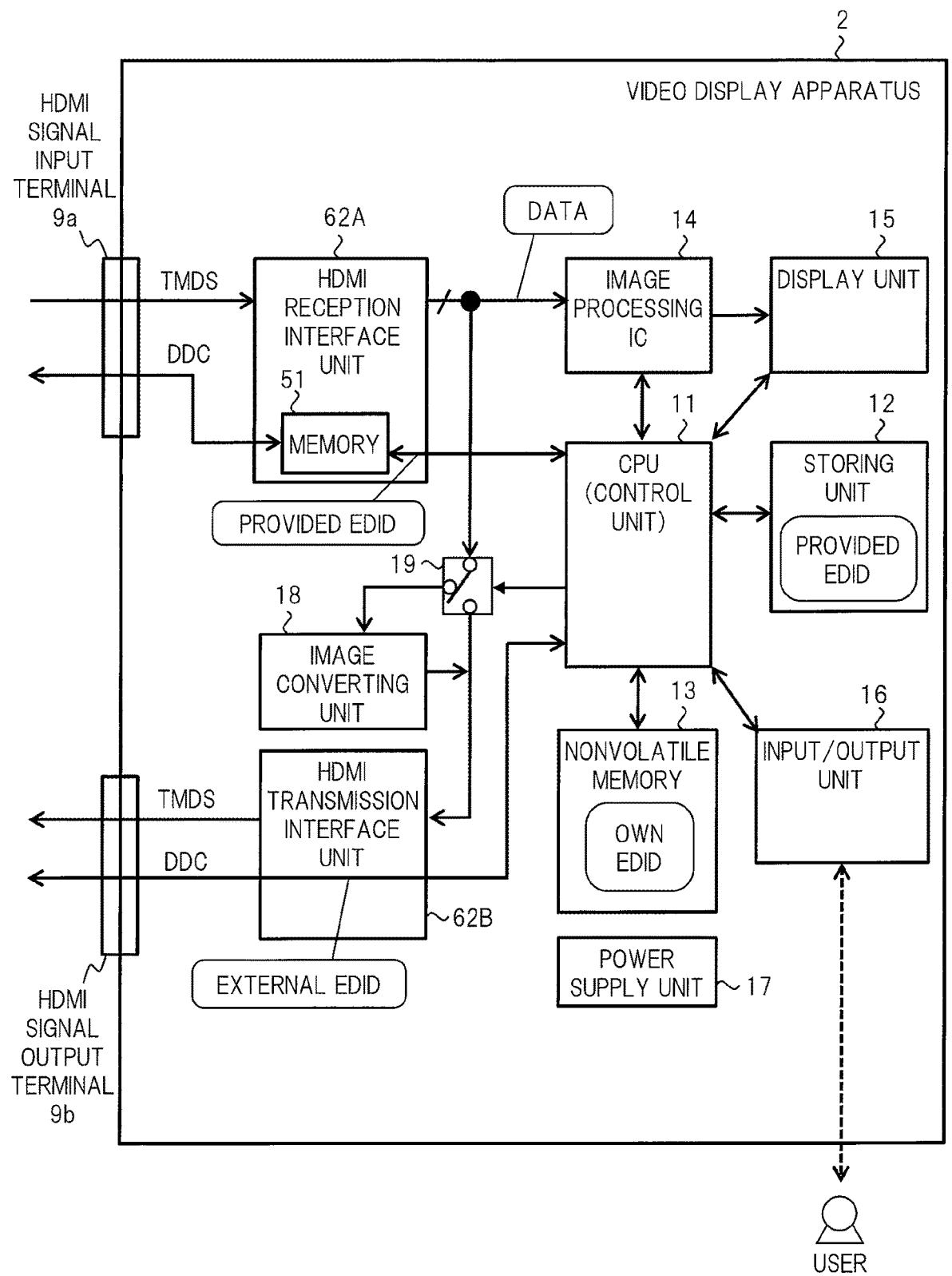
FIG. 13 is a view showing a configuration of a video display apparatus according to a second embodiment of the present invention.

FIG. 13 shows a configuration of the video display apparatus 2 according to the second embodiment. In FIG. 13, as a different point from FIG. 2, an image converting unit 18 is provided between an HDMI reception interface unit 62A (a receiving unit) and an HDMI transmission interface unit 62B (a transmitting unit).

The image converting unit 18 carries out conversion regarding resolution of video data of multimedia data. In a case where video data received through the receiving unit from a video output apparatus 1 positioned at a front stage thereof are transmitted to an external video display apparatus 3 positioned at a rear stage thereof through the transmitting unit, the image converting unit 18 carries out conversion regarding resolution or the like of the video data.

The image converting unit 18 carries out conversion to decrease or increase the resolution of the video data so as to match with resolution indicated by external EDID of the external apparatus positioned at the rear stage thereof, which is a video output destination. The image converting unit 18 carried out the conversion so as to match suitable resolution indicated by the external EDID, for example. The target of this conversion is not limited the resolution. A frame rate of the video data or the like may be converted.

The CPU 11 gives a control instruction to the image converting unit 18 and a switch 19 to control the image conversion described above. The switch 19 switches whether the video data from the HDMI reception interface unit 62A is inputted into the image converting unit 18 or not. The switch 19 may be a hard switch, but may be a software switch that switches on or off of a process of the image converting unit 18.

In this regard, as a modification example, the image converting unit 18 may be integrated in the image processing IC 14, for example. The image converting unit 18 may be means for converting other parameters of the multimedia data in addition to the conversion of the resolution of the video data.

[Example of Second Mode_EDID Transmission]

Figure 14:
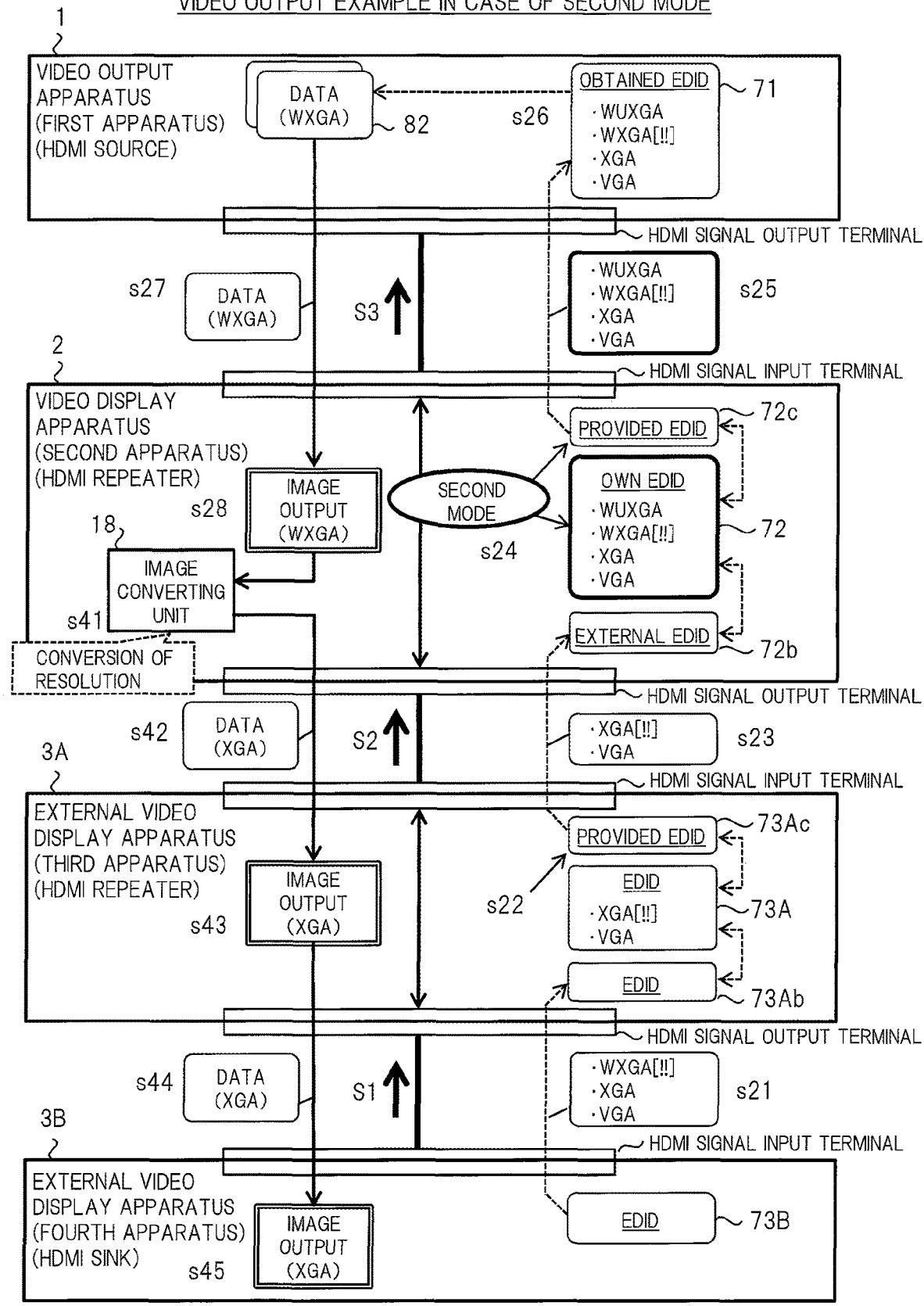
FIG. 14 is a view showing an apparatus connection example according to the second embodiment, that is, a sequence containing an example of EDID transmission and video output in case of a second mode.

FIG. 14 shows a sequence containing an example of EDID transmission and video output in case of a second mode according to the second embodiment. FIG. 14 is different from FIG. 7 in an operation after s28, and includes Steps s41 to s45 after s28.

At s41 after s28, the image converting unit 18 of the video display apparatus 2 carries out conversion to decrease resolution of data 82 in view of the external apparatus positioned at the rear stage thereof. The video display apparatus 2 carries out the conversion to decrease the resolution of the data 82 from WXGA to XGA by means of the image converting unit 18 in view of resolution (XGA[!!], VGA) of an external video display apparatus 3A positioned at a rear stage thereof, which is indicated by external EDID 72b.

At s42, the video display apparatus 2 transmits data (XGA) after conversion from an HDMI signal output terminal. The external video display apparatus 3A receives the data (XGA). At s43, the external video display apparatus 3A outputs an image whose resolution is XGA by using the data (XGA). Namely, in the external video display apparatus 3A, it is possible to output an image with XGA that is suitable resolution. At s44, the external video display apparatus 3A transmits the data (XGA) to an external video display apparatus 3B positioned at a rear stage thereof. The external video display apparatus 3B positioned at the rear stage thereof receives the data (XGA). At s45, the external video display apparatus 3B outputs an image whose resolution is XGA by using the data (XGA).

[Effects and the Like]

According to the video display apparatus 2 of the second embodiment, it is possible to realize suitable image output and the like in the own apparatus as well as the first embodiment, and there a possibility that it is possible to realize suitable image output even in the external video display apparatus 3 positioned at the rear stage thereof.

REFERENCE SINGS LIST

1 . . . video output apparatus, 2 . . . video display apparatus, 3 . . . external video display apparatus, 5a, 5b . . . HDMI cable, 61, 62B, 63B . . . HDMI transmission interface unit, 62A, 63A . . . HDMI reception interface unit, 71, 72, 73, 72b, 72c . . . EDID.

The invention claimed is:

1. A video display apparatus provided with an apparatus-apparatus communication interface,
wherein own apparatus information is held therein,
wherein in a case where a video input unit of the video display apparatus is connected to a video source apparatus via a first apparatus-apparatus communication interface and a video output unit of the video display apparatus is connected to an external video display apparatus via a second apparatus-apparatus communication interface,
external apparatus information of the external video display apparatus is obtained from the external video display apparatus via the second apparatus-apparatus communication interface, and
selected apparatus information is provided to the video source apparatus via the first apparatus-apparatus communication interface, and
wherein a first mode for providing the selected apparatus information that contains a parameter value of the external apparatus information and a second mode for providing the selected apparatus information that contains a parameter value of the own apparatus information are selectable as modes for providing the apparatus information,
wherein in the first mode, any of the parameter value of the external apparatus information, a common parameter value of the external apparatus information and the own apparatus information, and both parameter values of the external apparatus information and the own apparatus information when the external video display apparatus has higher performance than the video display apparatus is the selected apparatus information to be provided to the video source apparatus, and
wherein in the second mode, any of the parameter value of the own apparatus information, both parameter values of the own apparatus information and the external apparatus information, and a selected value from the both parameter values is the selected apparatus information to be provided to the video source apparatus.

2. The video display apparatus according to claim 1,
wherein, in a case where an own apparatus becomes no image output state in which a video is not displayed on a screen, stop of an AV signal to the external video display apparatus or output of an AV mute signal is carried out as an off-control operation for external video output.

3. The video display apparatus according to claim 1,
wherein, in a case where an own apparatus becomes no image output state in which a video is not displayed on a screen, output of an AV error signal to the external video display apparatus is carried out as an off-control operation for external video output to cause the external video display apparatus to output error information based on the AV error signal.

4. The video display apparatus according to claim 1,
wherein data that are determined by the video source apparatus by using the selected apparatus information are received via the first apparatus-apparatus communication interface; image output is carried out by an own apparatus on the basis of the data; and the data are transmitted to the external video display apparatus via the second apparatus-apparatus communication interface.

5. The video display apparatus according to claim 1, further comprising:
an image converting unit,
wherein data that are determined by the video source apparatus by using the selected apparatus information are received via the first apparatus-apparatus communication interface; image output is carried out by an own apparatus on the basis of the data; and data after the data are converted by the image converting unit in accordance with the parameter value of the external apparatus information are transmitted to the external video display apparatus via the second apparatus-apparatus communication interface.

6. The video display apparatus according to claim 1,
wherein the apparatus-apparatus communication interface is an HDMI, and
wherein the selected apparatus information is EDID.

7. The video display apparatus according to claim 1,
wherein the selected apparatus information contains one or more parameter values for specification or performance,
wherein resolution of video data is contained as the parameter value, and
wherein applicable resolution and suitable resolution are contained as the resolution.

8. The video display apparatus according to claim 1,
wherein the first mode and the second mode are switched in response to a user setting operation.

9. The video display apparatus according to claim 8,
wherein the first mode is a setting state for default, and it is switched from the first mode to the second mode by means of the user setting operation or a state of image output.

10. The video display apparatus according to claim 1,
wherein the mode to be applied at a time of an image output state, in which a video is displayed on a screen in an own apparatus, is different from the mode to be applied at a time of no image output state.

11. The video display apparatus according to claim 10,
wherein the first mode or the second mode is applied in accordance with a user setting state in case of the image output state, and the first mode is applied in case of the no image output state, and
wherein it is switched from the second mode to the first mode in case of changing from the image output state to the no image output state even when the user setting state is the second mode.

* * * * *